(12) United States Patent
Park et al.

(10) Patent No.: US 12,737,218 B2
(45) Date of Patent: Sep. 15, 2026

(54) METHOD AND DEVICE FOR SCHEDULING TASKS IN MULTI-CORE PROCESSOR

(71) Applicant: SAMSUNG ELECTRONICS CO., LTD., Suwon-si (KR)

(72) Inventors: Jonglae Park, Suwon-si (KR); Eunok Jo, Suwon-si (KR); Bumgyu Park, Suwon-si (KR); Seyeong Byeon, Suwon-si (KR); Daeyeong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 18/196,749

(22) Filed: May 12, 2023

(65) Prior Publication Data

US 2024/0086234 A1 Mar. 14, 2024

(30) Foreign Application Priority Data

Sep. 8, 2022 (KR) ........................ 10-2022-0114462

(51) Int. Cl.
*G06F 9/48* (2006.01)

(52) U.S. Cl.
CPC .................................. *G06F 9/4881* (2013.01)

(58) Field of Classification Search
CPC ............. G06F 9/4881; G06F 2209/483; G06F 9/5027; G06F 9/5038; G06F 9/4818; G06F 9/5066
USPC .......................................................... 718/106
See application file for complete search history.

(56) References Cited

U.S. PATENT DOCUMENTS 6,026,427 A * 2/2000 Nishihara ................. G06F 9/52 718/107
6,581,063 B1 * 6/2003 Kirkman ............. G06F 16/9024 707/999.102
8,140,876 B2 3/2012 Arnold et al.
9,575,799 B2 2/2017 Agarwal et al.
10,152,349 B1 12/2018 Anand
11,023,816 B2 6/2021 Cogill et al.
11,327,877 B2 5/2022 Joshi
2002/0077995 A1 * 6/2002 Allison ................. G06F 1/3209
2002/0138706 A1 * 9/2002 Hugly ..................... G06F 9/526 711/163
2006/0048149 A1 * 3/2006 Clift .......................... G06F 9/52 718/100
2006/0206897 A1 * 9/2006 McConnell ............... G06F 9/52 718/104

(Continued)

*Primary Examiner* — Adam Lee
(74) *Attorney, Agent, or Firm* — Sughrue Mion, PLLC

(57) ABSTRACT

An electronic device includes: a plurality of processing cores and a memory including a plurality of task queues respectively corresponding to the plurality of processing cores and a plurality of task relation tables respectively corresponding to a plurality of tasks. Each of the plurality of task relation tables includes: one or more entries representing a mapping relationship between an identifier of a waker task that wakes up a wakee task, and an occurrence count that is a number of times the wakee task is woken up by the waker task. At least one of the plurality of processing cores is configured to: execute a scheduler, search for a task set includes related tasks, based on the plurality of task relation tables, store a subset of tasks of the task set in at least one of the plurality of task queues, and schedule the task set.

20 Claims, 21 Drawing Sheets

(56) References Cited

U.S. PATENT DOCUMENTS

| | | | | |
|---|---|---|---|---|
| 2008/0010563 | A1* | 1/2008 | Nishimura | G06F 9/4812 714/E11.003 |
| 2012/0304185 | A1* | 11/2012 | Horikawa | G06F 9/526 718/102 |
| 2013/0067495 | A1* | 3/2013 | Singh | G06F 9/485 719/318 |
| 2014/0033220 | A1* | 1/2014 | Campbell | G06F 9/5038 718/104 |
| 2014/0143568 | A1* | 5/2014 | Kim | G06F 1/3215 713/323 |
| 2014/0189075 | A1* | 7/2014 | Stansell | G06F 9/546 709/220 |
| 2015/0135186 | A1 | 5/2015 | Lin et al. | |
| 2016/0098656 | A1 | 4/2016 | Ertl | |
| 2016/0246655 | A1* | 8/2016 | Kimmel | G06F 9/5088 |
| 2017/0094064 | A1* | 3/2017 | Kim | H04M 11/007 |
| 2019/0220827 | A1 | 7/2019 | Cogill et al. | |
| 2020/0394583 | A1 | 12/2020 | Sangekar | |
| 2021/0037461 | A1* | 2/2021 | Fryking | H04L 61/256 |
| 2021/0397314 | A1* | 12/2021 | Khan | G06F 3/04883 |
| 2022/0004433 | A1 | 1/2022 | Vega et al. | |
| 2022/0091883 | A1 | 3/2022 | Gadre | |
| 2022/0107837 | A1 | 4/2022 | Youn et al. | |

* cited by examiner 730
732
731
720
710
p1(≥pth)
p2(<pth)
Pid
Occurrence
A
B
C
D
E
F
G
H
I
J
K

Figure 11:
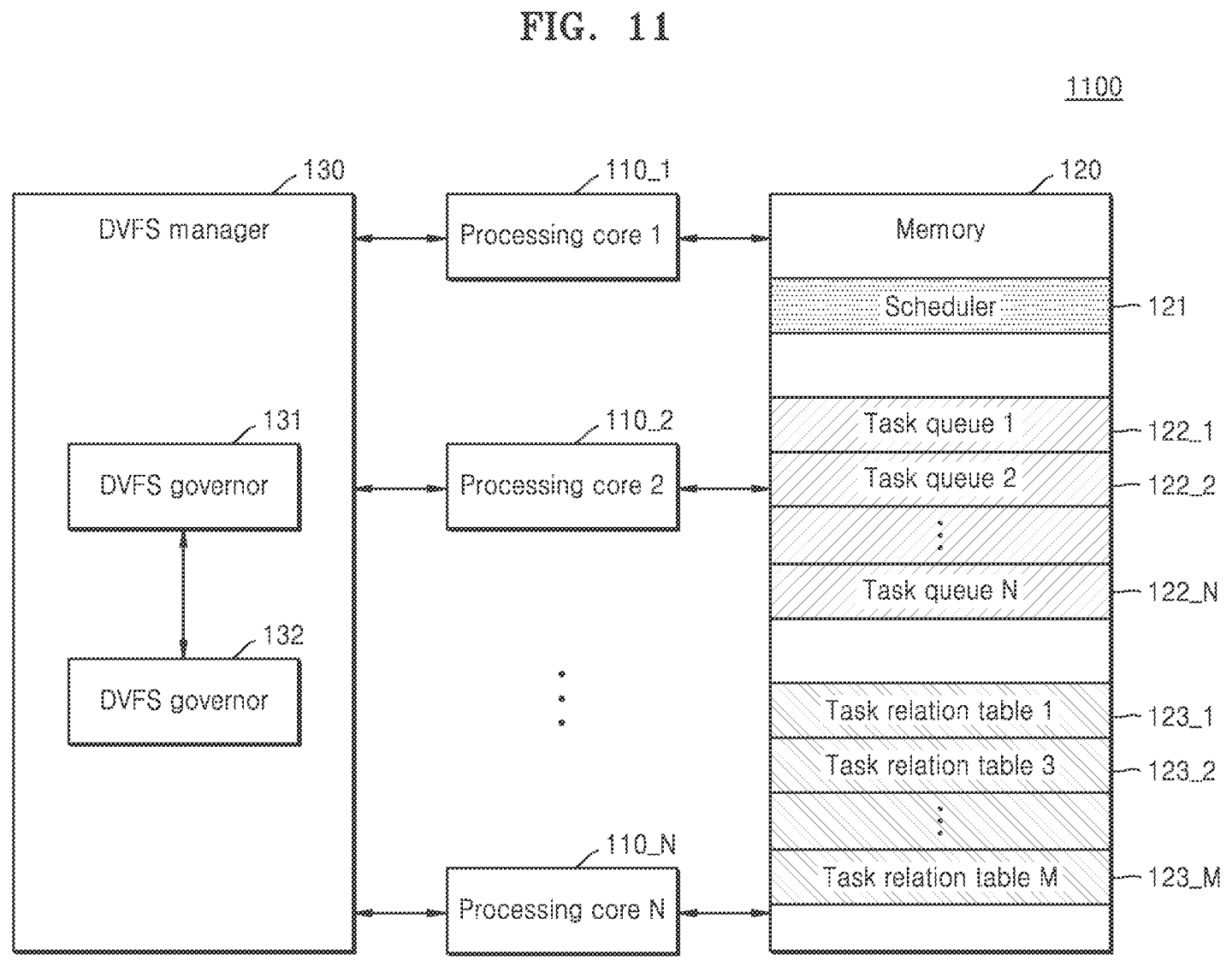

120 Memory
121 Scheduler
122_1 Task queue 1
122_2 Task queue 2
⋮
122_N Task queue N
123_1 Task relation table 1
123_2 Task relation table 3
⋮
123_M Task relation table M 110_1 Processing core 1
110_2 Processing core 2
⋮
110_N Processing core N 130 DVFS manager
131 DVFS governor
132 DVFS governor

METHOD AND DEVICE FOR SCHEDULING TASKS IN MULTI-CORE PROCESSOR

CROSS-REFERENCE TO RELATED APPLICATION

This application is based on and claims priority under 35 U.S.C. § 119 to Korean Patent Application No. 10-2022-0114462, filed on Sep. 8, 2022, in the Korean Intellectual Property Office, the disclosure of which is incorporated by reference herein in its entirety.

BACKGROUND

The disclosure relates to an electronic device and a method for scheduling tasks in a multi-core processor.

Processors (or programmable components) may execute instructions to perform various functions. Each of processors may include a plurality of processing cores for high performance, and each of the plurality of processing cores may independently execute instructions. A task including a series of instructions may be assigned in a processing core of the plurality of processing cores. The processing core may sequentially perform assigned tasks. Tasks having various attributes may occur in a system including the processor that may include different types of processing cores. Therefore, an operation of assigning tasks to the plurality of processing cores (i.e., an operation of scheduling tasks) may be significant in performance and efficiency of a system.

SUMMARY

Provided are a method and a device for efficiently scheduling tasks or assigning the tasks to a plurality of processing cores.

According to an aspect of the disclosure, an electronic device includes: a plurality of processing cores and a memory including a plurality of task queues respectively corresponding to the plurality of processing cores and a plurality of task relation tables respectively corresponding to a plurality of tasks. Each of the plurality of task relation tables includes: one or more entries representing a mapping relationship between an identifier of a waker task that wakes up a wakee task, and an occurrence count that is a number of times the wakee task is woken up by the waker task. At least one of the plurality of processing cores is configured to: execute a scheduler, search for a task set includes related tasks, based on the plurality of task relation tables, store a subset of tasks of the task set in at least one of the plurality of task queues, and schedule the task set.

According to another aspect of the disclosure, a method of scheduling a task in an electronic device includes a plurality of processing cores, includes: selecting at least one key task among a plurality of tasks, based on attributes of the plurality of tasks; generating a Markov chain representing a probability that a state transition between edges corresponding to tasks is performed, based on a plurality of task relation tables respectively corresponding to the plurality of tasks; searching for the at least one key task and interactive tasks interacting with the at least one key task in the Markov chain; and storing a task in at least one task queue of a plurality of task queues respectively corresponding to the plurality of processing cores, wherein the stored task includes the at least one key task and at least one task of the interactive tasks. Each of the plurality of task relation tables includes: an entry representing a mapping relationship between an identifier of a waker task that wakes up a wakee task, and an occurrence count that is a number of times the wakee task is woken up by the waker task.

According to another aspect of the disclosure, a non-transitory computer-readable storage medium storing instructions allowing task scheduling, executed by at least one of a plurality of processing cores classified into at least two core groups based on performance, to be performed, the task scheduling includes: selecting at least one key task among a plurality of tasks, based on attributes of the plurality of tasks; generating a Markov chain based on a plurality of task relation tables respectively corresponding to the plurality of tasks, wherein the Markov chain represents a probability that a state transition between edges corresponding to tasks is performed; searching for the at least one key task and interactive tasks interacting with the at least one key task in the Markov chain; and storing a task set in at least one task queue corresponding to a core group of the at least two core groups. The stored task set includes the at least one key task and at least one task of the interactive tasks. The at least one task queue has a performance that is higher than or equal to a reference performance. Each of the plurality of task relation tables includes: an entry representing a mapping relationship between an identifier of a waker task that wakes up a wakee task, and an occurrence count that is a number of times the wakee task is woken up by the waker task.

According to another aspect of the disclosure, a system on chip includes: a plurality of processors classified into at least two processor groups, based on performance; and a memory includes a plurality of task queues respectively corresponding to the plurality of processors and a plurality of task relation tables respectively corresponding to a plurality of tasks. Each of the plurality of task relation tables includes a plurality of entries representing a mapping relationship between an identifier of a waker task that wakes up a wakee task and an occurrence count that is a number of times the wakee task is woken up by the waker task. At least one of the plurality of processors is configured to: execute a scheduler, search for a task set includes related tasks, based on the plurality of task relation tables, store a subset of tasks of the task set in at least one task queue corresponding to a processor group of the at least two processor groups, the at least one task queue having a performance that is higher than or equal to reference performance, and schedule the task set.

BRIEF DESCRIPTION OF DRAWINGS

The above and other aspects, features, and advantages of certain embodiments of the disclosure will be more apparent from the following description taken in conjunction with the accompanying drawings, in which:

FIG. 11 illustrates an electronic device according to another embodiment;

DETAILED DESCRIPTION OF EMBODIMENTS

Figure 1:
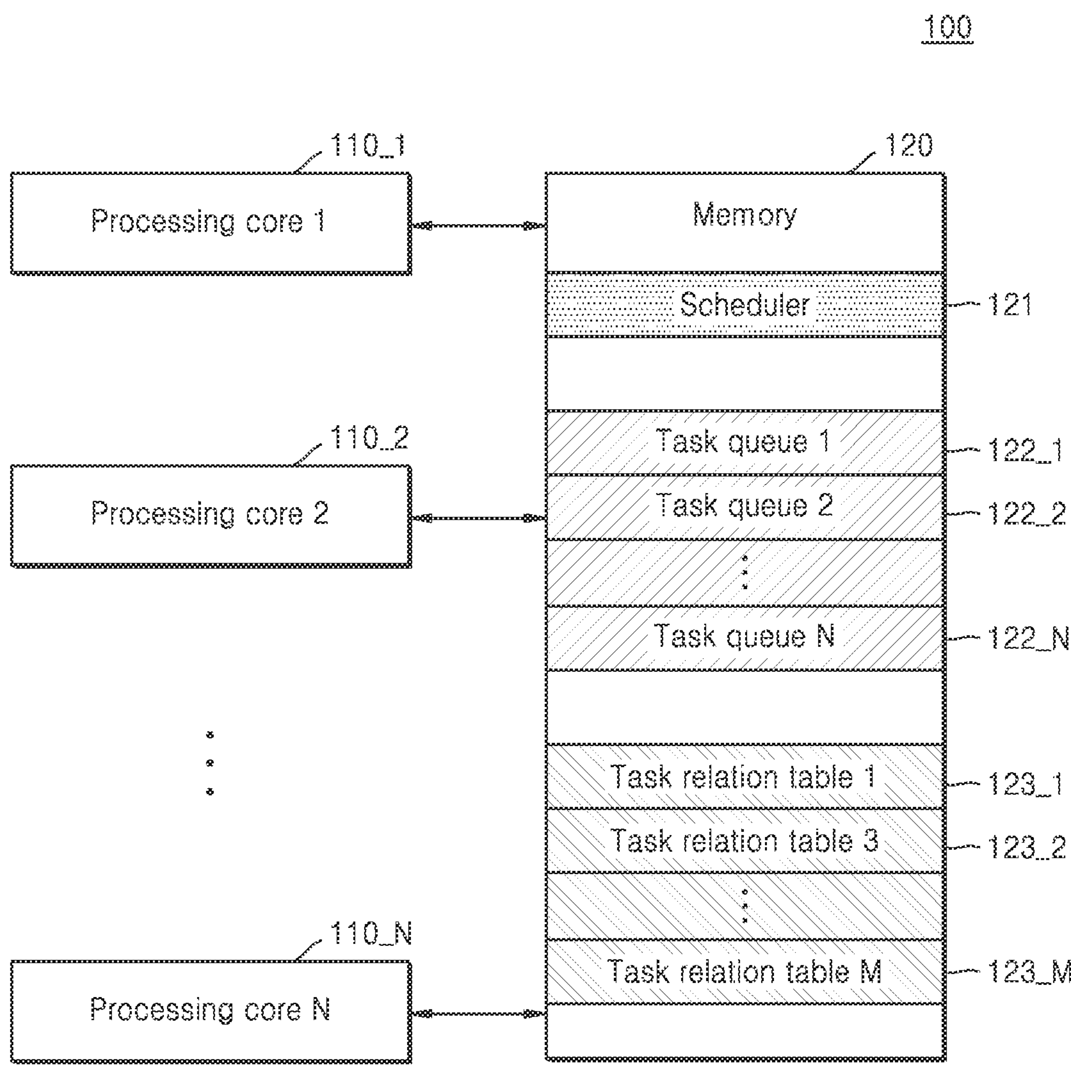
FIG. 1 illustrates an electronic device according to an embodiment.

Before undertaking the detailed description below, it may be advantageous to set forth definitions of certain words and phrases used throughout the present disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances, such definitions apply to prior as well as future uses of such defined words and phrases.

Hereinafter, embodiments of the disclosure will be described in detail with reference to the accompanying drawings.

FIG. 1 illustrates an electronic device 100 according to an embodiment.

Referring to FIG. 1, the electronic device 100 may include a computing system such as a personal computer (PC), a mobile phone, or a server. The electronic device 100 may include a plurality of processing cores 110_1, 110_2, . . . , and 110_N and a memory 120. The electronic device 100 may be, for example, a module where the plurality of processing cores 110_1, 110_2, . . . , and 110_N and the memory 120 are independent packages and mounted on a substrate. The electronic device 100 may include, for example, a system on chip (SoC). In the SoC, the plurality of processing cores 110_1, 110_2, . . . , and 110_N and the memory 120 may be embedded in one chip.

The plurality of processing cores 110_1, 110_2, . . . , and 110_N may be referred to as a multi-core processor. In another embodiment, the electronic device 100 including the plurality of processing cores 110_1, 110_2, . . . , and 110_N and the memory 120 may be referred to as a multi-core processor. Here, N may be an integer of 2 or more.

The plurality of processing cores 110_1, 110_2, . . . , and 110_N may communicate with the memory 120 and may independently execute instructions. In some embodiments, each of the plurality of processing cores (for example, first, second, . . . , to Nth processing cores) 110_1, 110_2, . . . , and 110_N may execute a task stored in a task queue corresponding thereto among a plurality of task queues (for example, first, second, . . . , to Nth task queues) 122_1, 122_2, . . . , to 122_N included in the memory 120. For example, the first processing core 110_1 may execute a task stored in the first task queue 122_1, and the second processing core 110_2 may execute a task stored in the second task queue 122_2 included in the memory 120. Each of the plurality of task queues 122_1, 122_2, . . . , and 122_N may include a series of instructions. A task may be a unit of a job which may be assigned in the plurality of processing cores 110_1, 110_2, . . . , and 110_N. A processing core may be arbitrary hardware for independently executing instructions and may be referred to as a central processing unit (CPU), a processor core, or a core.

In an embodiment, the plurality of processing cores 110_1, 110_2, . . . , and 110_N may be homogeneous processing cores. For example, each of the plurality of processing cores 110_1, 110_2, . . . , and 110_N may be provide the same performance in executing the same task. In other embodiments, the plurality of processing cores 110_1, 110_2, . . . , and 110_N may be heterogeneous processing cores. For example, in an embodiment, the plurality of processing cores 110_1, 110_2, . . . , and 110_N may include a processing core (hereinafter referred to as a big core) for providing relatively high performance and power consumption and a processing core (hereinafter referred to as a little core) for providing relatively low performance and power consumption. Therefore, each of the heterogeneous processing cores may provide a different performance (for example, execution time and power consumption) in executing the same task. The plurality of processing cores 110_1, 110_2, . . . , and 110_N according to an embodiment may be classified into at least two core groups based on performance. For example, when two core groups are provided, a processing core having relatively high performance may be included in a core group having performance which may be greater than or equal to reference performance. A core group may be referred to as a processor group or a processing core group.

The memory 120 may store information and may be arbitrary hardware accessible by the plurality of processing cores 110_1, 110_2, . . . , and 110_N. For example, the memory 120 may include read only memory (ROM), random access memory (RAM), dynamic random access memory (DRAM), double-data-rate dynamic random access memory (DDR-DRAM), synchronous dynamic random access memory (SDRAM), static random access memory (SRAM), magnetoresistive random access memory (MRAM), programmable read only memory (PROM), erasable programmable read only memory (EPROM), electrically erasable programmable read only memory (EEPROM), flash memory, polymer memory, phase change memory, ferroelectric memory, silicon-oxide-nitride-oxide-silicon (SONOS) memory, magnetic card/disk, optical card/disk, or a combination of two or more thereof.

The memory 120 may be accessed by the plurality of processing cores 110_1, 110_2, . . . , and 110_N. The memory 120 may store a software element executable by the plurality of processing cores 110_1, 110_2, . . . , and 110_N. In a non-limiting embodiment, the software element may include a software component, a program, an application, a computer program, an application program, a system program, a software development program, a machine program, operating system (OS) software, middleware, firmware, a software module, a routine, a subroutine, a function, a method, a procedure, a software interface, an application program interface (API), an instruction set, computing code, computer code, a code segment, a computer code segment, a word, a value, a symbol, or a combination of two or more thereof. For example, the memory 120 may store a scheduler 121 and may include the plurality of task queues 122_1, 122_2, . . . , and 122_N and a plurality of task relation tables (for example, first to Mt h task relation tables) 123_1, 123_2, . . . , and 123_M.

The scheduler 121 may be executed by at least one of the plurality of processing cores 110_1, 110_2, . . . , and 110_N. For example, the scheduler 121 may be periodically and/or aperiodically executed by at least one of the plurality of processing cores 110_1, 110_2, . . . , and 110_N. Herein, a process where a processing core executes the scheduler 121 to perform an operation may be expressed as a process where the scheduler 121 performs an operation.

The scheduler 121 may assign tasks in the plurality of processing cores 110_1, 110_2, . . . , and 110_N. For example, the scheduler 121 may select a task, which may be performed by the second processing core 110_2, among the tasks and may store the selected task in the second task queue 122_2. Therefore, tasks to be executed by the plurality of processing cores 110_1, 110_2, . . . , and 110_N may be determined by the scheduler 121, and the performance and efficiency of the system 10 may be based on the scheduler 121.

In some embodiments, the scheduler 121 may be included in a kernel. For example, an OS may be executed in the system 10, and applications may be executed in the OS. The scheduler 121 may schedule tasks occurring in an upper layer (for example, a framework or an application) and/or tasks occurring in the kernel (for example, tasks occurring due to a device driver) including the scheduler 121.

Each of the plurality of task queues 122_1, 122_2, . . . , and 122_N may store a task (or information about a task) which may be executed by a processing core corresponding thereto. For example, the second task queue 122_2 may store at least one task assigned in the second processing core 110_2 by the scheduler 121 and may be accessed by the second processing core 110_2. The plurality of task queues 122_1, 122_2, . . . , and 122_N may be allocated to a partial area of the memory 120, and the plurality of processing cores 110_1, 110_2, . . . , and 110_N may access an area, to which the plurality of task queues 122_1, 122_2, . . . , and 122_N are allocated, of the memory 120 so as to execute a task or to schedule tasks by executing the scheduler 121. In some embodiments, the plurality of task queues 122_1, 122_2, . . . , and 122_N may not be continuously allocated in the memory 120. Herein, a 'task queue' may be referred to as a 'queue.'

The plurality of task relation tables 123_1, 123_2, . . . , and 123_M may respectively correspond to a plurality of tasks. For example, the first task relation table 123_1 may correspond to a first task, the second task relation table 123_2 may correspond to a second task, and the $M^{th}$ task relation table 123_M may correspond to an $M^{th}$ task. Here, M may be an integer of 2 or more. Each of the plurality of task relation tables 123_1, 123_2, . . . , and 123_M may be data for assigning relevant tasks in the same core group. A task relation table of a certain task may include one or more entries, and one entry may represent a mapping relationship between an identifier (or a process identifier executing a corresponding task) of a task relevant to a certain task and the number of times the certain task responds to the task relevant to the certain task. A task relation table will be described below with reference to FIG. 4.

In some embodiments, the scheduler 121 may reassign the tasks, stored in the plurality of task queues 122_1, 122_2, . . . , and 122_N, in the plurality of processing cores 110_1, 110_2, . . . , and 110_N. The reassignment may be performed by storing a reassignment target task in the plurality of task queues 122_1, 122_2, . . . , and 122_N. As described above, an operation of reassigning a task stored in a task queue may be referred to as a 'scheduling.'

It may be possible that relevant tasks may not be optimally scheduled in a non-deterministic system processing unpredictable user inputs like a mobile phone. According to one or more embodiments, task scheduling may considerably improve performance and efficiency in the non-deterministic system. Hereinafter, embodiments will be described with reference to an electronic device including two processing cores, but the disclosure is not limited thereto.

In some embodiments, the scheduler 121 may be stored in a non-transitory computer-readable storage medium. The term "computer-readable medium" may include an arbitrary type of medium accessible by a computer, like ROM, RAM, a hard disk drive, a compact disk (CD), a digital video disk (DVD), or another type of memory. A non-transitory computer-readable medium may exclude wired, wireless, optical, or other communication links for transitory electrical or other signals and may include a medium for permanently storing data and a medium for storing data and overwriting data later like a recordable optical disk or an erasable memory device.

Figure 2:
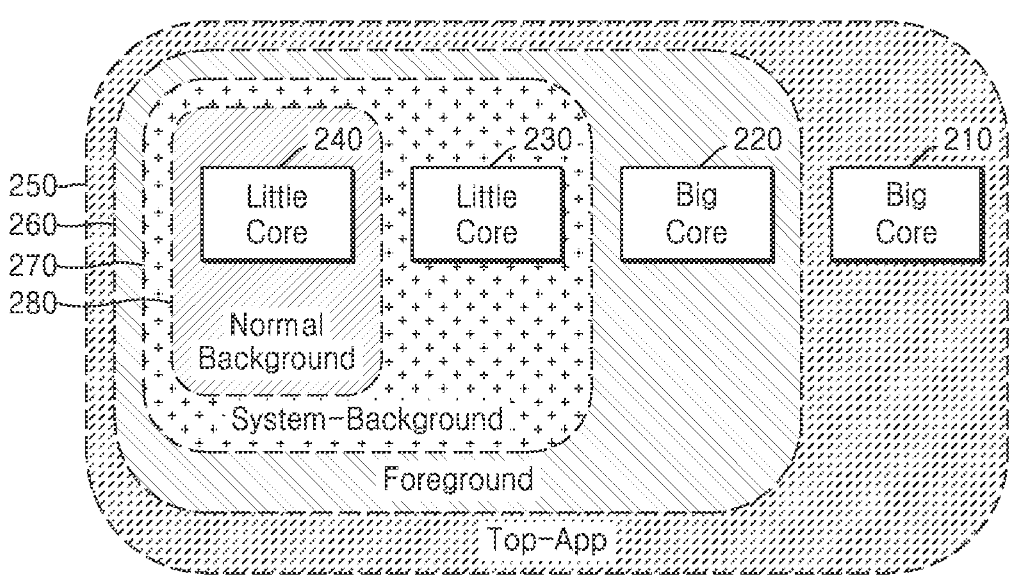
FIG. 2 illustrates a processing core system according to an embodiment.

FIG. 2 illustrates a processing core system 200 according to an embodiment. In detail, the block diagram of FIG. 2 may represent a processing core system including heterogeneous processing cores and task groups executable in the heterogeneous processing cores.

Referring to FIG. 2, the processing core system 200 may be a system that may be implemented in the electronic device 100 illustrated in FIG. 1. The processing core system 200 may include processing cores respectively included in two or more core groups. For example, the processing core system 200 may include a first big core 210 and a second big core 220 each included in a big core group and may include a first little core 230 and a second little core 240 each included in a little core group. A processing core (i.e., a big core) included in a big core group may provide relatively high performance and power consumption, and a processing core (i.e., a little core) included in a little core group may provide relatively low performance and power consumption. A big core may be referred to as a 'faster core,' and a little core may be referred to as a 'slower core.' In some embodiments, the processing core system 200 may include two or more big cores and/or two or more little cores. In some embodiments, the processing core system 200 may include one big core and/or one little core. In some embodiments, the number of cores of each core group may be equal in some core groups and may differ in some other core groups.

A task may be included in one of a plurality of task groups, based on a significance or a priority. For example, a task may be included in one of a top-App group 250, which performs an operation for a current display of the processing core system 200, a foreground group 260 that performs an operation relevant to a current display of the processing core system 200, and a background group that performs an operation irrelevant to a current display of the processing core system 200. Also, the background group may be classified into a normal background group 280 and a system background group 270, which performs an operation needed for operating of the processing core system 200.

In some embodiments, a core for executing a task may be determined based on a significance of the task. For example, tasks included in the top-App group 250 having highest significance may be executed by at least one of the first big core 210, the second big core 220, the first little core 230, and the second little core 240, and may be preferentially executed by the first big core 210 and the second big core 220. Tasks included in the foreground group 260 may be executed by at least one of the second big core 220, the first little core 230, and the second little core 240. Tasks included in the system background group 270 may be executed by at least one of the first little core 230 and the second little core 240, and tasks included in the normal background group 280 may be executed by the second little core 240. In some embodiments, a relationship between a significance of a task and an executed core may differ from the embodiment.

In some embodiments, despite a relationship between a task group classified based on significance and an execution core for the task group, a certain task may be executed by another core. Tasks included in the normal background group 280 may include one or more tasks relevant to a task (herein, referred to as a 'key task') that may be included in only the foreground group 260 or only the top-App group 250. A key task and a task associated with the key task may be organically executed in the non-deterministic system. That is, the task associated with the key task may be executed, and then, the key task may be executed.

For example, when a key core may be assigned in a big core group and a task associated with the key task may be assigned in a little core group, because an operation speed of the little core group may be relatively slow, a timing for executing the key task may be delayed and a total system speed and/or performance may be reduced. In order to improve total system performance, a scheduler according to embodiments may assign relevant tasks in a certain core group.

Figure 3:
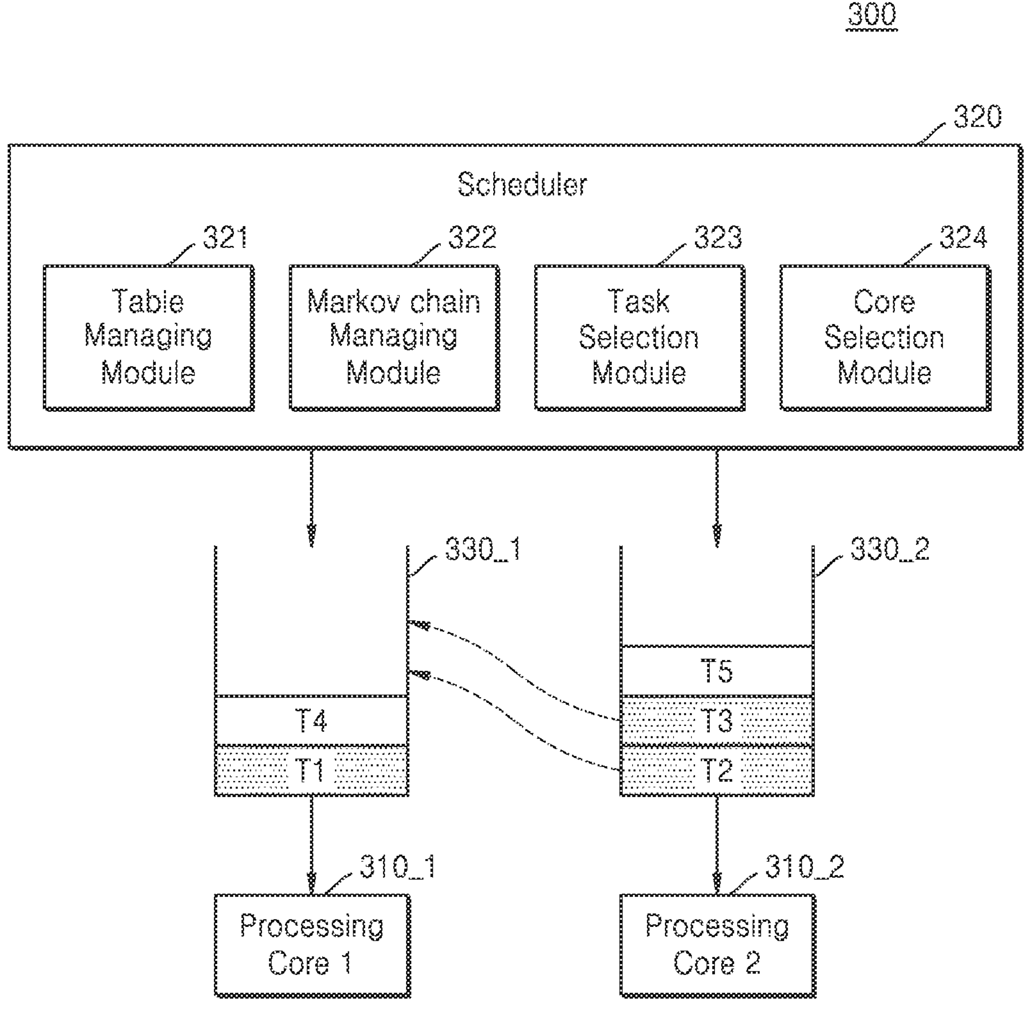
FIG. 3 illustrates an operation of scheduling tasks, according to an embodiment.

FIG. 3 illustrates an operation of scheduling tasks, according to an embodiment.

Referring to FIG. 3, an electronic device 300 according to an embodiment may correspond to the electronic device 100 illustrated in FIG. 1. The electronic device 300 may include a first processing core 310_1, a second processing core 310_2, a scheduler 320, a first task queue 330_1, and a second task queue 330_2.

In some embodiments, the first processing core 310_1 and the second processing core 310_2 may be heterogeneous processing cores. For example, the first processing core 310_1 may be a big core, and the second processing core 310_2 may be a little core. However, the disclosure is not limited thereto. Hereinafter, the first processing core 310_1 may be a big core and the second processing core 310_2 may be a little core.

The first processing core 310_1 and/or the second processing core 310_2 may execute the scheduler 320. The first processing core 310_1 may access the first task queue 330_1. The second processing core 310_2 may access the second task queue 330_2.

The scheduler 320, the first task queue 330_1, and the second task queue 330_2 may be stored in the memory 120 illustrated in FIG. 1. The scheduler 320 may include a table managing module 321, a Markov chain managing module 322, a task selection module 323, and a core selection module 324. Each of the table managing module 321, the Markov chain managing module 322, the task selection module 323, and the core selection module 324 may be a software element and may be executed by the first processing core 310_1 and/or the second processing core 310_2, which execute(s) the scheduler 320. Hereinafter, the first processing core 310_1 and/or the second processing core 310_2 may perform an operation by executing each of the table managing module 321, the Markov chain managing module 322, the task selection module 323, and the core selection module 324 may be referred to as an operation performed by each of the table managing module 321, the Markov chain managing module 322, the task selection module 323, and the core selection module 324.

The table managing module 321 may manage the plurality of task relation tables 123_1, 123_2, . . . , and 123_M, as illustrated in FIG. 1. For example, the table managing module 321 may generate a task relation table of a task which occurs newly, based on a corresponding task. As another example, the table managing module 321 may periodically or aperiodically change information included in a task relation table. As another example, the table managing module 321 may periodically or aperiodically update a task relation table. The table managing module 321 will be described below with reference to FIGS. 5A and 5B.

The Markov chain managing module 322 may generate a Markov chain, based on the plurality of task relation tables 123_1, 123_2, . . . , and 123_M, as illustrated in FIG. 1. The Markov chain may represent a change in a state of a system with respect to a time. A system may change a state or may maintain the same state each time. The system may be referred to as an 'edge,' or may be referred to as a 'state change transition' (or a state transition). The Markov chain may represent a probability that a state transition between edges occurs. In an embodiment, an edge may correspond to a task. The Markov chain managing module 322 may calculate a probability that a state transition between edges occurs, based on the plurality of task relation tables 123_1, 123_2, . . . , and 123_M. An embodiment of the Markov chain will be described below with reference to FIGS. 7A and 7B.

The task selection module 323 may select a task that may be scheduled. In an embodiment, the task selection module 323 may search for a task set in the Markov chain. The task set may include relevant tasks. For example, the first task T1, the second task T2, and the third task T3 may be relevant to one another. In this case, the task set may include the first task T1, the second task T2, and the third task T3. The task selection module 323 may select at least some tasks from the found task set.

For example, the task selection module 323 may select the second task T2 and the third task T3 stored in the second task queue 330_2. The at least some tasks may denote a total task set, or may denote one or more of tasks included in the task set. In an embodiment, the task selection module 323 may select at least one key task among a plurality of tasks, based on attributes of a plurality of tasks. An attribute of a task may be, for example, a priority or significance of the task, but is not limited thereto. A task occurring in an upper layer (i.e., an upper layer of a kernel) of a scheduler may have a priority which may be assigned based on a significance thereof.

For example, a task may be included in one of a top-App group having a highest priority, a background group having a lowest priority, and a foreground group having a priority between the top-App group and the background group. In some embodiments, a priority of a task may be assigned based on a significance of the task in a layer of a scheduler (i.e., a kernel layer). For example, a Linux kernel may be classified into a real time (RT) task and a normal task, and the RT task may have a priority which may be higher than that of the normal task.

The core selection module 324 may select at least one processing core for scheduling at least some tasks included in a selected task set. For example, the core selection module 324 may select the first processing core 310_1. The core selection module 324 may store at least some tasks, selected by the task selection module 323, in a task queue corresponding to a selected processing core.

In an embodiment, when the first processing core 310_1 and the second processing core 310_2 are heterogeneous processing cores, the core selection module 324 may store at least some tasks of a task set in at least one task queue corresponding to a processing core group (for example, a big core group), having performance that may be higher than or equal to reference performance, of at least two processing core groups.

For example, when the first task T1, the second task T2, and the third task T3 are included in the task set and the second task T2 and the third task T3 are selected by the task selection module 323, the core selection module 324 may select the first processing core 310_1 and may store the second task T2 and the third task T3 in the first task queue 330_1, so that the second task T2 and the third task T3 move from the second task queue 330_2 to the first task queue 330_1.

Unlike the illustration of FIG. 2, when the electronic device 300 includes three or more processing cores, the core selection module 324 may further select a processing core having performance that may be higher than or equal to that of the first processing core 310_1 and differs from that of the second processing core 310_2, in addition to the first processing core 310_1. In some embodiments, the core selection module 324 may select a core, based on energy aware scheduling (EAS) and/or completely fair scheduler (CFS).

Figure 4:
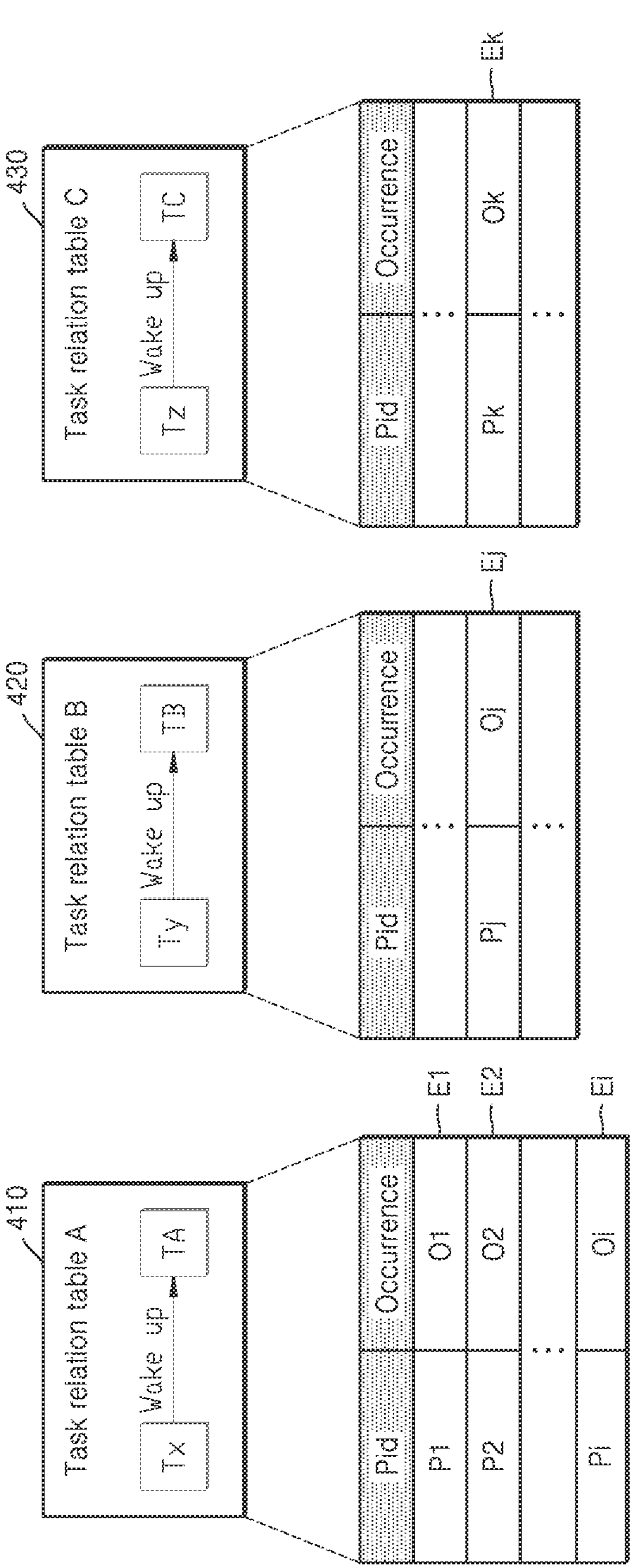
FIG. 4 illustrates a plurality of task relation tables according to an embodiment.

FIG. 4 illustrates a plurality of task relation tables according to an embodiment. In one embodiment, the number of task relation tables is three, as illustrated in FIG. 4.

Referring to FIG. 4, each of three task relation tables 410, 420, and 430 may include an entry representing a mapping relationship between an identifier Pid of a waker task and an occurrence count. The waker task may be a task which wakes up a wakee task. The wakee task may be a task for a task relation table. The waker task may be relative to the wakee task. For example, when there are a first waker task (that wakes up the wakee task) and a second waker task (that wakes up the first wafer task), the first waker task may be a wakee task corresponding to the second waker task. An occurrence count may be the number of times the wakee task may be woken up by the waker task.

The task relation table 410 of a task A TA may represent a mapping relationship between an identifier of an arbitrary task x Tx which wakes up the task A TA and an occurrence count which may be the number of times the arbitrary task x Tx wakes up the task A TA. In this case, the task A TA may be a wakee task, and the arbitrary task x Tx may be a waker task.

The task relation table 410 of the task A TA may include a first entry E1 to an $i^{th}$ entry Ei. Here, i may be an integer of 1 or more. The first entry E1 may represent a mapping relationship between a first identifier P1 representing a first task and a first occurrence count O1. That is, based on the first entry E1, the number of times the first task wakes up the task A TA may be the first occurrence count O1. The second entry E2 may represent a mapping relationship between a second identifier P2 representing a second task and a second occurrence count O2. That is, based on the second entry E2, the number of times the second task wakes up the task A TA may be the second occurrence count O2. The $i^{th}$ entry Ei may represent a mapping relationship between an $i^{th}$ identifier Pi representing an $i^{th}$ task and an $i^{th}$ occurrence count Oi. That is, based on the $i^{th}$ entry Ei, the number of times the $i^{th}$ task wakes up the task A TA may be the $i^{th}$ occurrence count Oi.

A total occurrence count in the task relation table 410 of the task A TA may include a sum of first to $i^{th}$ occurrence counts O1 to Oi. A probability that the first task wakes up the task A TA may be calculated as a ratio of the first occurrence count O1 to the total occurrence count (for example, the sum of first to $i^{th}$ occurrence counts O1 to Oi). A probability that the second task wakes up the task A TA may be calculated as a ratio of the second occurrence count O2 to the total occurrence count. Similarly, a probability that the $i^{th}$ task wakes up the task A TA may be calculated as a ratio of the $i^{th}$ occurrence count Oi to the total occurrence count.

The task relation table 420 of a task B TB may represent a mapping relationship between an identifier of an arbitrary task y Ty which wakes up the task B TB and an occurrence count which may be the number of times the arbitrary task y Ty wakes up the task B TB. In this case, the task B TB may be a wakee task, and the arbitrary task y Ty may be a waker task. The task relation table 420 of the task B TB may include the $j^{th}$ entry Ej. Here, j may be a natural number. The $j^{th}$ entry Ej may represent a mapping relationship between a $j^{th}$ identifier Pj representing a $j^{th}$ task and a $j^{th}$ occurrence count Oj. That is, based on the $j^{th}$ entry Ej, the number of times the $j^{th}$ task wakes up the task B TB may be the $j^{th}$ occurrence count Oj. The number of entries in the task relation table 420 of the task B TB may be finite, like the number of entries in the task relation table 410 of the task A TA.

A total occurrence count may be calculated from occurrence counts in the task relation table 420. A probability that the $j^{th}$ task wakes up the task B TB may be calculated as a ratio of the $j^{th}$ occurrence count Oj to the total occurrence count.

The task relation table 430 of a task C TC may represent a mapping relationship between an identifier of an arbitrary task z Tz which wakes up the task C TC and an occurrence count which may be the number of times the arbitrary task z Tz wakes up the task C TC. In this case, the task C TC may be a wakee task, and the arbitrary task z Tz may be a waker task. The task relation table 430 of the task C TC may include the kth entry Ek. Here, k may be a natural number. The kth entry Ek may represent a mapping relationship between a kth identifier Pk representing a kth task and a kth occurrence count Ok. The number of entries in the task relation table 430 of the task C TC may be finite.

A probability that the kth task wakes up the task C TC in the task relation table 430 of the task C TC may be calculated as a ratio of the kth occurrence count Ok to the total occurrence count.

The task x Tx, the task y Ty, and the task z Tz may be arbitrary tasks and may be the same or differ.

Figure 5A:
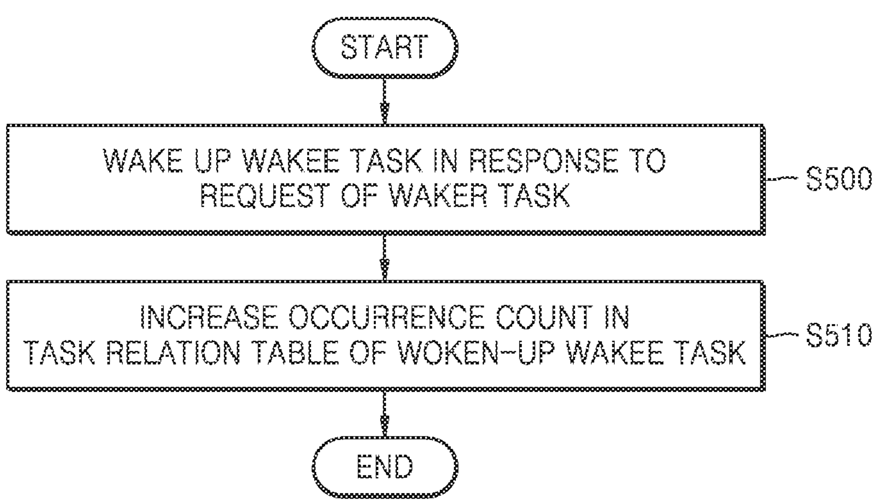
FIGS. 5A and 5B illustrate an operation of increasing a woken-up occurrence count, according to an embodiment.
Figure 5B:
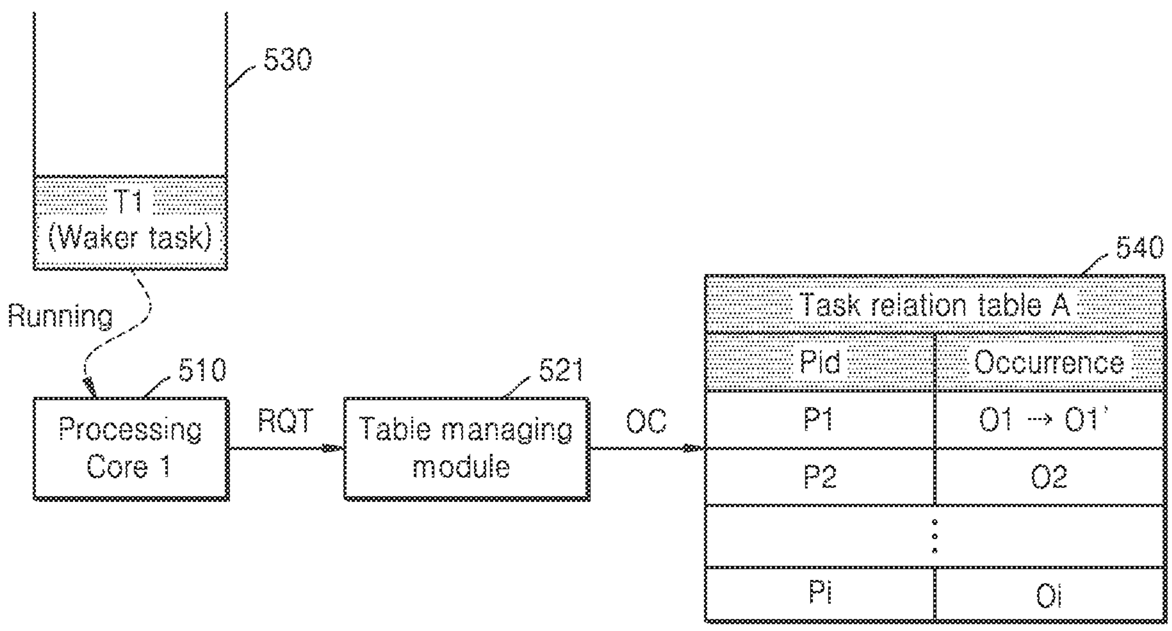

FIGS. 5A and 5B are diagrams for describing an operation of increasing a woken-up occurrence count, according to an embodiment.

Referring to FIGS. 1 and 5A, in operation S500, at least one of the plurality of processing cores 110_1, 110_2, . . . , and 110_N may execute the scheduler 121 to wake up a wakee task in response to a request of a waker task. Referring to FIGS. 4 and 5B, for example, a first processing core 510 may execute the first task T1 stored in a first task queue 530. In one embodiment, the first task T1 may be a waker task and the task A TA may be a first wakee task corresponding to the first task T1. The first task T1 may wake up the first wakee task. When the first task T1 may be executed or run by the first processing core 510, the first processing core 510 may transfer a request RQT, waking up the task A TA, to a table managing module 521.

At least one of the plurality of processing cores 110_1, 110_2, . . . , and 110_N illustrated in FIG. 1 may execute the scheduler 121, and thus, the table managing module 521 may operate. The table managing module 521 may wake up the task A TA. When the task A TA may be woken up, a task relation table 540 of the task A TA may be loaded. In this case, the task relation table 540 of the task A TA may be referred to as a first task relation table corresponding to a first wakee task.

Referring to FIGS. 1 and 5A, in operation S510, at least one of the plurality of processing cores 110_1, 110_2, . . . , and 110_N may execute the scheduler 121, and thus, an occurrence count in a task relation table of a woken-up wakee task may increase. In other words, an occurrence count which may be the number of times the first wakee task may be woken up by the first waker task may increase.

Referring to FIGS. 4 and 5B, for example, the table managing module 521 may generate a count value OC in response to a request RQT which wakes up the task A TA. A first occurrence count O1 corresponding to a first identifier P1 of a first task T1 in the task relation table 540 of the task A TA may increase (for example, O1'). In an embodiment, an occurrence count may increase by 1 each time.

As described above, when an occurrence count, which may be the number of times a waker task wakes up a wakee task, increases, a probability that the waker task wakes up the wakee task may increase. Therefore, a corresponding waker task and wakee task may be found and scheduled as a task set.

Furthermore, when the table managing module 521 increases an occurrence count in a task relation table of a wakee task whenever a waker task wakes up the wakee task, a data size of the task relation table of the wakee task may increase.

When an electronic device (for example, the electronic device 100 illustrated in FIG. 1) in the non-deterministic system operates for a certain time, a scenario may occur where the number of times an arbitrary waker task (for example, the first task illustrated in FIG. 5B) wakes up a wakee task (for example, the task A TA illustrated in FIGS. 4 and 5B) increases relatively more. However, when the electronic device in the non-deterministic system operates for another certain time, a scenario which differs from the scenario described above may occur. Accordingly, in order to optimally schedule tasks related to one another, it may be needed to periodically or aperiodically update a task relation table of a wakee task.

Figure 6A:
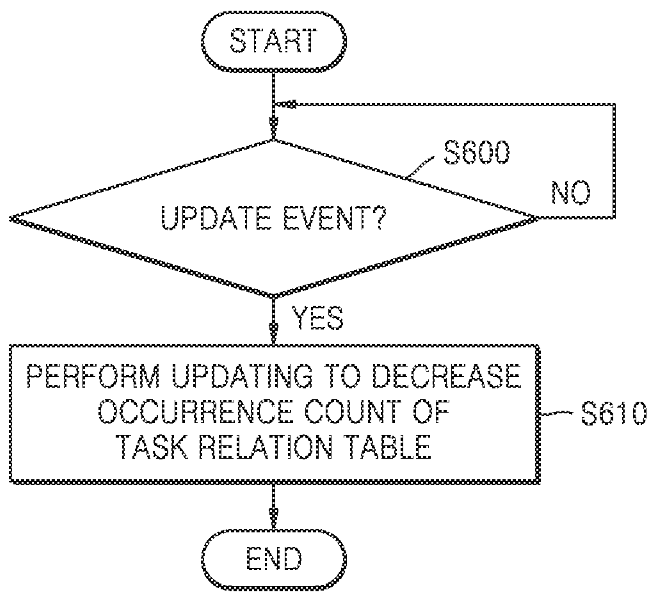
FIGS. 6A and 6B illustrate an operation of updating an occurrence count, according to an embodiment.
Figure 6B:
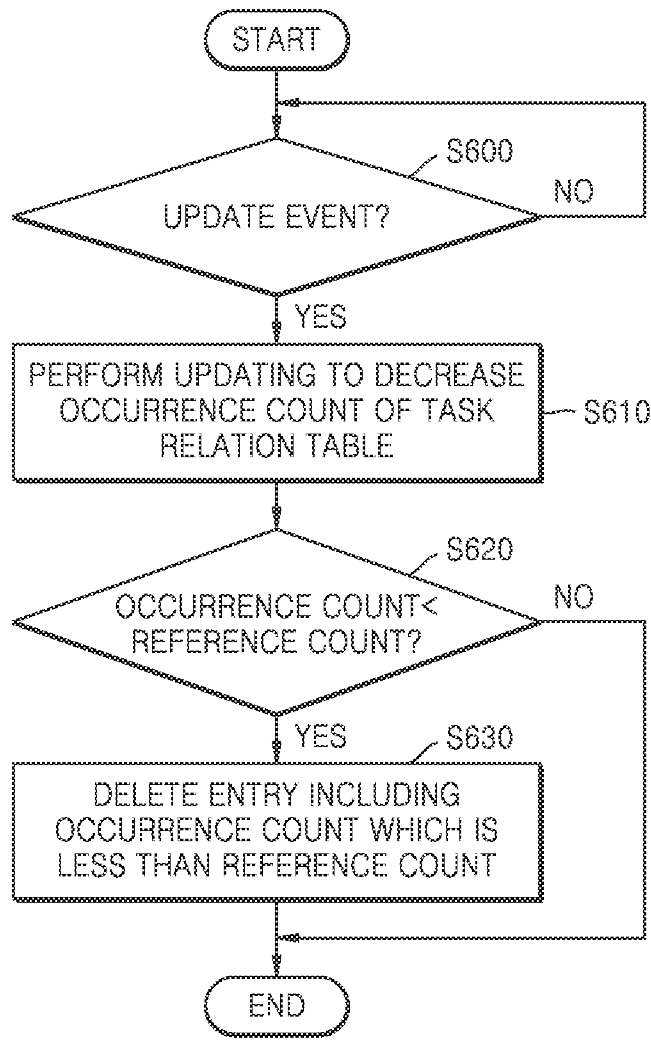

FIGS. 6A and 6B are diagrams for describing an operation of updating an occurrence count, according to an embodiment.

An operation of updating an occurrence count illustrated in FIGS. 6A and 6B may be performed by the table managing module 321 illustrated in FIG. 3 or the table managing module 521 illustrated in FIG. 5B.

Referring to FIGS. 1 and 6A, in operation S600, at least one of the plurality of processing cores 110_1, 110_2, . . . , and 110_N may execute the scheduler 121, and thus, whether an update event occurs may be monitored. In an embodiment, the update event may periodically occur. For example, a period of the update event may be about 100 ms, but is not limited thereto. A periodically occurring update event may be referred to as a periodic event. In another embodiment, an update event may aperiodically occur. For example, when a new user application, program or software may be executed in the electronic device 100, an update event may occur after an input of the user occurs. However, the disclosure is not limited thereto. An aperiodically occurring update event may be referred to as an 'aperiodic event.'

An operation of monitoring whether an update event occurs may be performed continuously until the update event occurs in operation S600 (NO).

When the update event occurs in operation S600 (YES), at least one of the plurality of processing cores 110_1, 110_2, . . . , and 110_N may execute the scheduler 121, and thus, the plurality of task relation tables 123_1, 123_2, . . . , and 123_M may be updated so that an occurrence count in a task relation table may be reduced. In an embodiment, at least one of the plurality of processing cores 110_1, 110_2, . . . , and 110_N may update a first task relation table so that an occurrence count of at least one entry included in a first task relation table may be reduced, in response to an update event.

Referring to FIG. 5B, for example, a task relation table 540 of a task A TA may be a first task relation table corresponding to a first wakee task. A table managing module 521 may decrease each of a changed first occurrence count O1' and second to $i^{th}$ occurrence counts O2 to Oi, and thus, the task relation table 540 of the task A TA may be updated.

In an embodiment, the table managing module 521 may initialize an occurrence count of each entry, included in the plurality of task relation tables 123_1, 123_2, . . . , and 123_M, to a predetermined initial value, and thus, an occurrence count may decrease. Alternatively, the table managing module 521 may reset an occurrence count of each entry included in a task relation table, thereby decreasing an occurrence count. Referring to FIG. 5B, for example, the table managing module 521 may initialize or reset each of the changed first occurrence count O1' and the second to $i^{th}$ occurrence counts O2 to Oi to 0.

In another embodiment, the table managing module 521 may divide, by a predetermined division value, an occurrence count of each entry included in the plurality of task relation tables 123_1, 123_2, . . . , and 123_M, and thus, an occurrence count may be reduced. Referring to FIG. 5B, for example, the table managing module 521 may divide each of the changed first occurrence count O1' and the second to $i^{th}$ occurrence counts O2 to Oi to 0 by an even number. Here, the even number which may be a division value may be one of 2, 4, 6, etc. However, the disclosure is not limited thereto, and the division value may include an odd number, a prime number, or the like.

In another embodiment, the table managing module 521 may substitute an occurrence count of each entry, included in the plurality of task relation tables 123_1, 123_2, . . . , and 123_M, into the following Equation 1 and may calculate a result value based on the following Equation 1, thereby decreasing an occurrence count.

$$O_{new}=K\times O_{present}+L \quad \text{[Equation 1]}$$

Here, $O_{new}$ may denote a new occurrence count or a result value, $O_{present}$ may denote a current occurrence count, K may denote a value between 0 and 1, and L may denote a value of 0 or less. In an embodiment, when the multiplication of K and the current occurrence count may be not an integer, L may be set to a value for adjusting the multiplication of K and the current occurrence count (for example, $O_{present}$) to an integer.

Referring to FIG. 5B, for example, the table managing module 521 may substitute each of the changed first occurrence count O1' and the second to $i^{th}$ occurrence counts O2 to Oi into the following Equation 1 and may calculate first to $i^{th}$ result values as new first to $i^{th}$ occurrence counts of the task relation table 540 of the task A TA.

As described above, a data size of a task relation table may decrease, and thus, a storage capacity of a memory may be secured. Also, as described above, the performance of task scheduling may increase by searching for related tasks.

Furthermore, when a certain waker task does not continuously wake up a certain wakee task, an occurrence count in the entries included in the plurality of task relation tables 123_1, 123_2, . . . , and 123_M may decrease to a certain value or less, based on the update operation described above. This may denote that a relation between a certain waker task and a certain wakee task may be relatively reduced. Accordingly, in order to efficiently use a storage capacity of a memory, it may be needed to delete an entry corresponding to tasks, which may be relatively low in relation, of the entries included in the plurality of task relation tables 123_1, 123_2, . . . , and 123_M.

Referring to FIGS. 1 and 6A, operation S600 and operation S610 are as described above with reference to FIG. 6A, and thus, descriptions thereof are omitted.

In operation S620, at least one of the plurality of processing cores 110_1, 110_2, . . . , and 110_N may execute the scheduler 121, and thus, whether an occurrence count of each entry included in the plurality of task relation tables 123_1, 123_2, . . . , and 123_M may be less than a reference count may be monitored. Referring to FIG. 5B, for example, the table managing module 521 may compare the reference count with the first to $i^{th}$ occurrence counts O1' to Oi included in the task relation table 540 of the task A TA.

When there is an entry including an occurrence count which may be less than the reference count in operation S620 (YES), in operation S630, at least one of the plurality of processing cores 110_1, 110_2, . . . , and 110_N may execute the scheduler 121, and thus, the entry including the occurrence count which may be less than the reference count may be deleted.

Referring to FIG. 5B, for example, the $i^{th}$ occurrence count Oi may be less than the reference count. In this case, the table managing module 521 may delete the $i^{th}$ entry, representing a mapping relationship between the $i^{th}$ identifier Pi and the $i^{th}$ occurrence count Oi, in the task relation table 540 of the task A TA. For example, when all occurrence counts included in a certain task relation table are less than the reference count, the table managing module 521 may delete all entries of a corresponding task relation table.

When there is no entry including an occurrence count which may be less than the reference count in operation S620 (NO), a corresponding operation may end. As described above, a data size of a task relation table may be adjusted, and thus, a storage capacity of a memory may be secured.

Figure 7A:
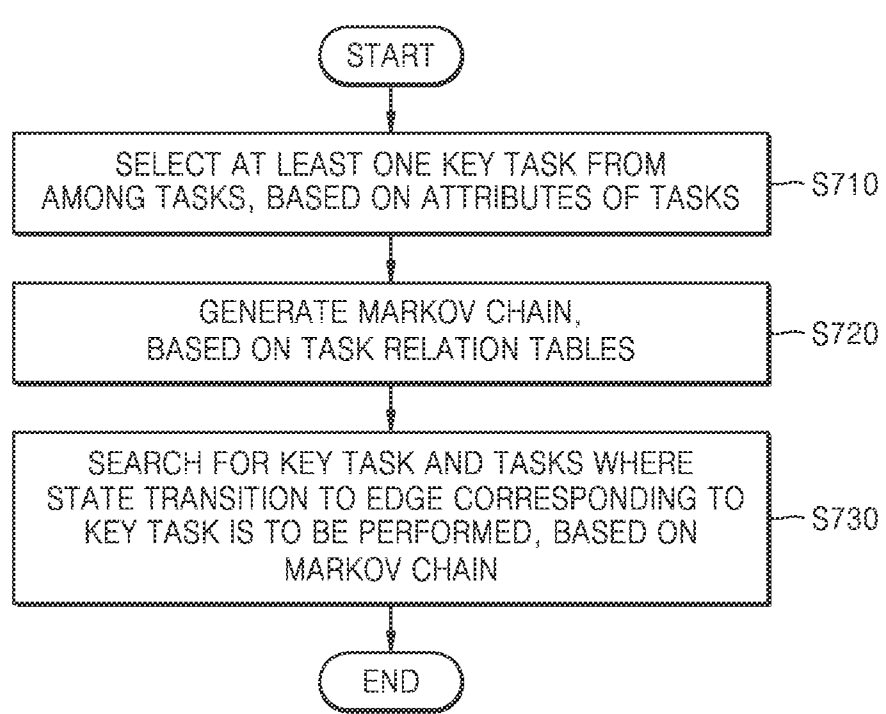
FIGS. 7A and 7B illustrate an operation of generating a Markov chain and searching for a task set, according to an embodiment.
Figure 7B:
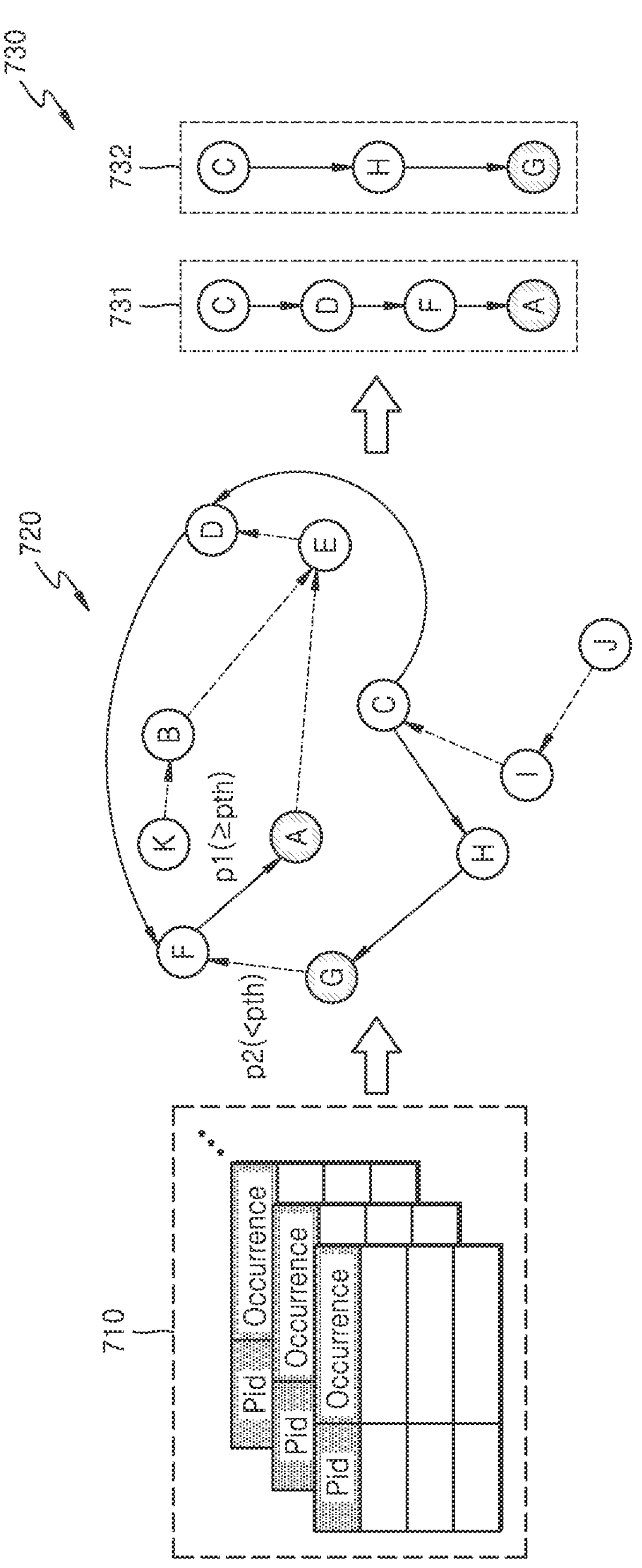

FIGS. 7A and 7B are diagrams for describing an operation of generating a Markov chain and searching for a task set, according to an embodiment.

An operation of generating a Markov chain illustrated in FIGS. 7A and 7B and searching for a task set may be performed by the task selection module 323, the Markov chain managing module 322, and the task selection module 323 each illustrated in FIG. 3.

Referring to FIGS. 1 and 7A, in operation S710, at least one of the plurality of processing cores 110_1, 110_2, . . . , and 110_N may execute the scheduler 121, and thus, may select at least one key task among a plurality of tasks, based on attributes of the plurality of tasks. In an embodiment, an attribute of a task may be a significance of the task, and a key task may be a task which may be included in only the foreground group 260 or only the top-App group 250. However, the disclosure is not limited thereto.

Referring to FIGS. 1 and 7A, in operation S720, at least one of the plurality of processing cores 110_1, 110_2, . . . , and 110_N may execute the scheduler 121, and thus, a Markov chain may be generated based on the plurality of task relation tables 123_1, 123_2, . . . , and 123_M. Here, the Markov chain may represent a probability that a state transition between an edge corresponding to a waker task and an edge corresponding to a wakee task may be performed.

Referring to FIGS. 3, 4, and 7B, for example, the Markov chain managing module 322 may calculate a probability that a waker task wakes up a wakee task by using a plurality of task relation tables 710. To provide a detailed description with reference to the three task relation tables 410 to 430 illustrated in FIG. 4, for example, the Markov chain managing module 322 may calculate a ratio of a first occurrence count O1 to a total occurrence count (for example, a sum of first to $i^{th}$ occurrence counts O1 to Oi) in the task relation table 410 of the task A TA to calculate a probability that a first task wakes up the task A TA.

Also, the Markov chain managing module 322 may calculate a ratio of a second occurrence count O2 to the total occurrence count, and thus, may calculate a probability that a second task wakes up the task A TA and may calculate a probability that each of third to $i^{th}$ tasks wakes up the task A TA.

Similarly, the Markov chain managing module 322 may calculate a probability that an arbitrary waker task wakes up a wakee task, with respect to tasks (for example, the task B TB and the task C TC each illustrated in FIG. 4). The Markov chain managing module 322 may generate a Markov chain corresponding to wakee tasks from the plurality of task relation tables 710.

In one embodiment, there are tasks A, B, C, D, E, F, G, H, I, J, and K, as illustrated in FIG. 7B, a Markov chain 720 representing a probability that a state transition between edges A, B, C, D, E, F, G, H, I, J, and K respectively corresponding to the tasks A to K is performed may be generated. In this case, a key task includes the task A corresponding to the edge A (A) and the task G corresponding to the edge G (G).

Referring to FIGS. 1 and 7A, in operation S730, at least one of the plurality of processing cores 110_1, 110_2, . . . , and 110_N may execute the scheduler 121, and thus, may search for, as a task set, at least one key task and tasks for a state transition to an edge corresponding to at least one key task in a Markov chain. Referring to FIG. 7B, for example, tasks for a state transition to the edge A corresponding to the task A may be the task F, the task D, and the task C respectively corresponding to the edge F (F), the edge D (D), and the edge C (C).

Alternatively, tasks for a state transition to the edge A corresponding to the task A may be the task F, the task D, the task E, the task B, and the task K respectively corresponding to the edge F (F), the edge D (D), the edge E (E), the edge B (B), and the edge K (K). Alternatively, tasks for a state transition to the edge A corresponding to the task A may be the task F, the task D, the task E, the task B, and the task K respectively corresponding to the edge F (F), the edge D (D), the edge E (E), the edge B (B), and the edge K (K). Alternatively, tasks for a state transition to the edge A corresponding to the task A may be the task F, the task G, the task H, the task C, the task I, and the task J respectively corresponding to the edge F (F), the edge G (G), the edge H (H), the edge C (C), the edge I (I), and the edge J (J). Tasks for a state transition to the edge G corresponding to the task G may be the task H, the task C, the task I, and the task J respectively corresponding to the edge H (H), the edge C (C), the edge I (I), and the edge J (J).

When a probability that a state transition between edges is performed is relatively low, the degree of relation of corresponding tasks may be relatively low. In order to search for tasks having a relatively high relation, in an embodiment, the task selection module 323 may search for tasks, having a probability which is higher than or equal to a reference probability pth, as a task set among tasks on which a state transition to an edge corresponding to at least one key task is to be performed.

Referring to FIG. 7B, for example, a probability that a state transition from the edge F (F) to the edge A (A) is performed is "p1" and a probability that a state transition from the edge G (G) to the edge F (F) is performed is "p2". Also, in one embodiment, "p1" is higher than or equal to the reference probability pth and "p2" may be less than the reference probability pth. The tasks A and F on which a state transition from the edge F (F) to the edge A (A) is performed may be found as a task set. As in a dotted-line arrow illustrated in FIG. 7, tasks having a probability which is lower than the reference probability pth may not be included in the task set.

When a certain occurrence count in each task relation table is largest, a relation between a corresponding waker task and a corresponding wakee task may be relatively high. In order to search for tasks having a relatively high relation, in an embodiment, the task selection module 323 may search for, as a task set, at least one task having a maximum occurrence count among tasks on which a state transition to an edge corresponding to at least one key task may be performed, based on occurrence counts in the plurality of task relation tables 710.

Referring to FIG. 7B, according to an embodiment described above, the at least one task set 730 may be found. The task C, the task D, the task F, and the task A corresponding to a path 731 for a state transition to the edge C (C), the edge D (D), the edge F (F), and the edge A (A) may be included in one task set. The task C, the task H, and the task G corresponding to a path 732 for a state transition to the edge C (C), the edge H (H), and the edge G (G) may be included in one other task set.

Figure 8:
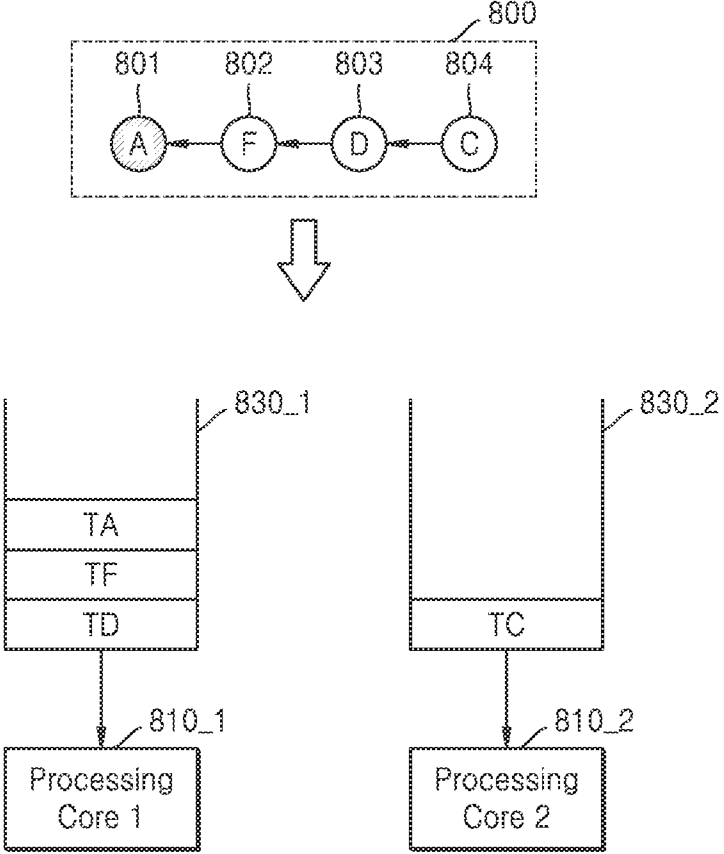
FIG. 8 illustrates an operation of scheduling a task set, according to an embodiment.

FIG. 8 illustrates an operation of scheduling a task set, according to an embodiment.

Referring to FIGS. 1 and 8, a path 800 illustrated in FIG. 8 may be a path for a state transition to an edge C (C), an edge D (D), an edge F (F), and an edge A (A) and may be the same as the path 731 described above with reference to FIG. 7B.

In one embodiment, in FIG. 8, an operation of scheduling a task set with respect to one path 800 will be described, but the disclosure is not limited thereto. An operation of scheduling a task set with respect to the other path 732 illustrated in FIG. 7B may be understood by those of ordinary skill in the art. A task C (TC), a task D (TD), a task F (TF), and a task A (TA) each included in the path 800 may be included in a task set.

In an embodiment, at least one of the plurality of processing cores 110_1, 110_2, . . . , and 110_N may execute the scheduler 121, and thus, may store at least some tasks, included in a task set, in at least one task queue corresponding to a big core group. In this case, at least some tasks that are to be stored in a task queue corresponding to a big core group may include a key task corresponding to a final edge on which a state transition may be lastly performed and a task corresponding to an edge on which a state transition to a final edge may be performed.

Referring to FIG. 8, for example, a final edge on which a state transition may be lastly performed in the path 800 may be the edge A, and a key task corresponding to the final edge may be the task A (TA). Also, an edge on which a state transition to the edge A is performed may be the edge F (F), and a task corresponding to the edge F (F) may be the task F (TF). However, the disclosure is not limited thereto. Hereinafter, at least some tasks to be stored in a task queue corresponding to a big core group are the task A (TA), the task F (TF), and the task D (TD).

Furthermore, in FIG. 8, in one embodiment, a first processing core 810_1 may be included in the big core group and a second processing core 810_2 may be not included in the big core group. Also, in one embodiment, a first task queue 830_1 corresponds to the first processing core 810_1 and a second task queue 830_2 corresponds to the second processing core 810_2.

In this case, the task A (TA), the task F (TF), and the task D (TD) may be stored in the first task queue 830_1. In this case, the order of state transitions may be the task D (TD), the task A (TA), and the task F (TF), and thus, the task selection module 323 and the core selection module 324 may store the task D (TD), the task F (TF), and the task A (TA) in the first task queue 830_1, so that the task D (TD), the task F (TF), and the task A (TA) are sequentially executed by the first processing core 810_1. The task D (TD) may be scheduled prior to the task F (TF) and the task A (TA), and the task F (TF) may be scheduled prior to the task A (TA). The task C (TC) may be stored in the second task queue 830_2 so as to be executed by the second processing core 810_2.

Unlike the illustration of FIG. 8, in another embodiment, at least some tasks to be stored in the task queue corresponding to the big core group may be the task edge F (TF) and the task edge A (TA). Alternatively, in another embodiment, at least some tasks to be stored in the task queue corresponding to the big core group may be the task C (TC), the task D (TD), the task F (TF), and the task A (TA).

As described above, tasks related to a key task may be efficiently scheduled in a big core, a scheduling priority assigned to the key task may be secured. Because the scheduling priority assigned to the key task may be secured, the performance of an electronic device may be improved.

Furthermore, a wake-up relationship between a waker task and a wakee task in the non-deterministic system may be complicated. Accordingly, the number of edges on which a state transition may be performed in a Markov chain may increase, and thus, scheduling performance may be reduced. In order to improve scheduling performance, it may be required to decrease the number of edges in the Markov chain.

Figure 9A:
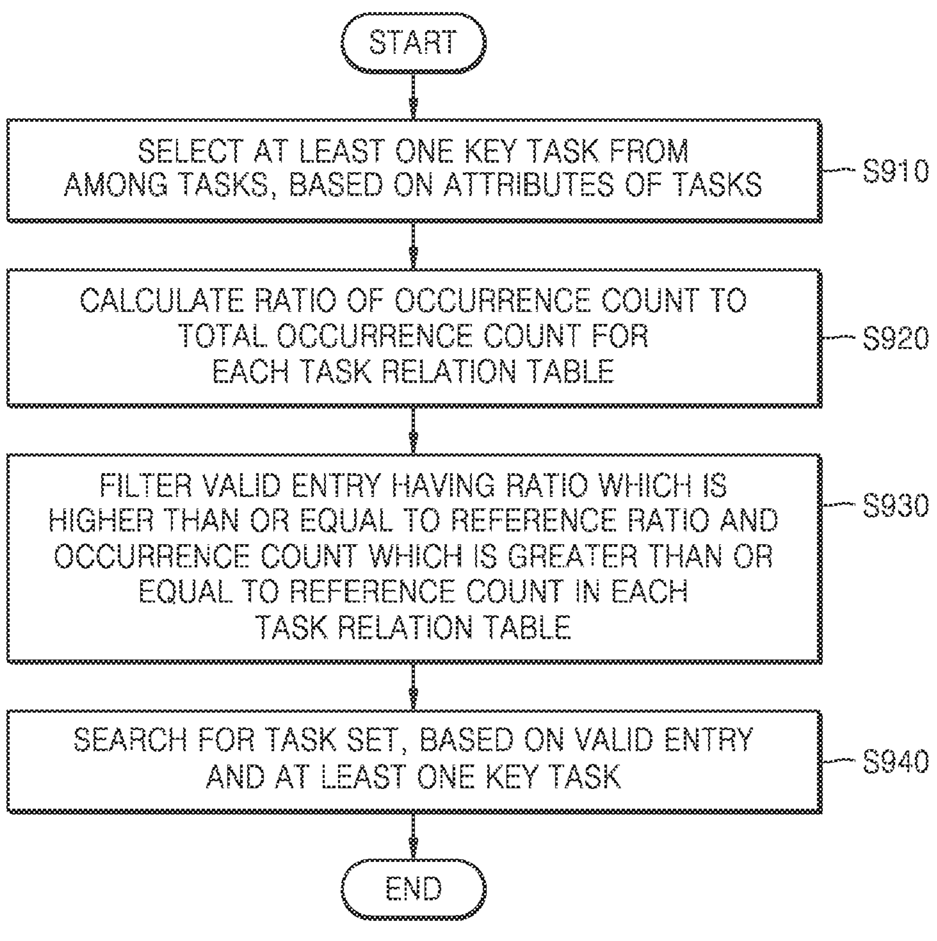
FIGS. 9A and 9B illustrate an operation of generating a Markov chain and searching for a task set, according to another embodiment.
Figure 9B:
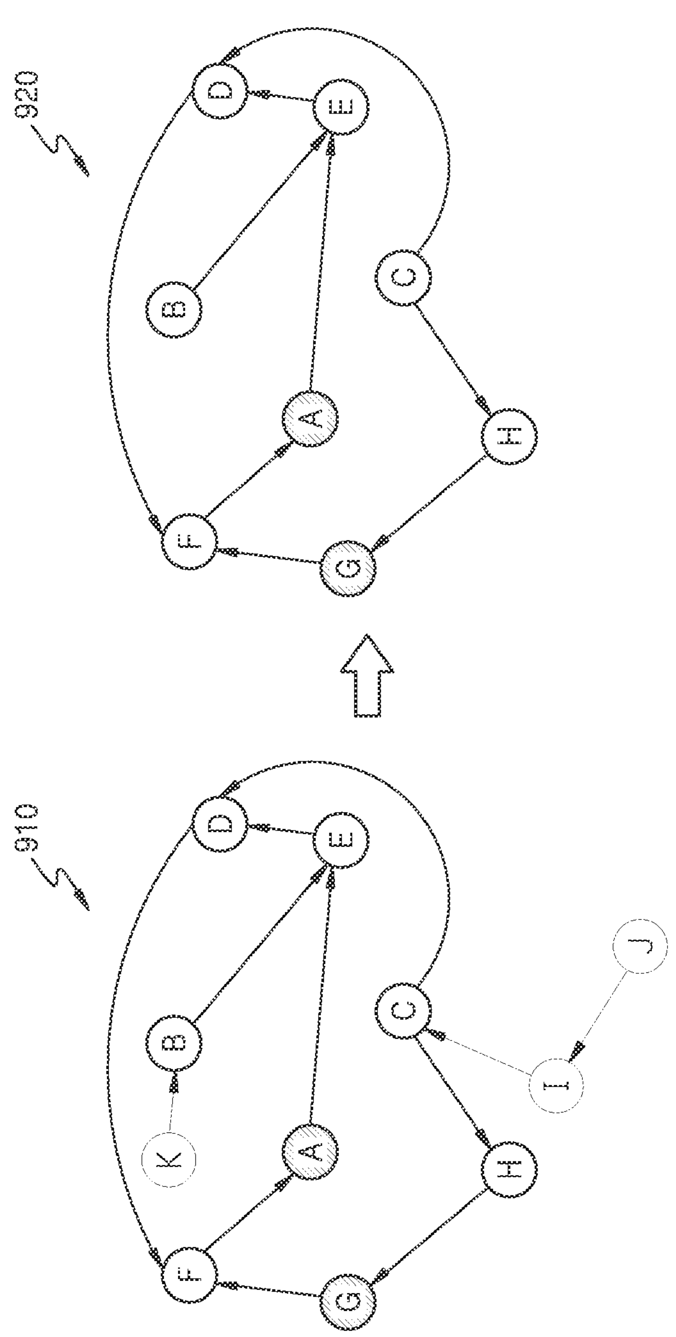

FIGS. 9A and 9B are diagrams for describing an operation of generating a Markov chain and searching for a task set, according to another embodiment.

Referring to FIGS. 1 and 9A, operation S910 may be the same as operation S710 described above with reference to FIG. 7A.

In operation S920, at least one of the plurality of processing cores 110_1, 110_2, . . . , and 110_N may execute the scheduler 121, and thus, may calculate a ratio of at least one occurrence count to a total occurrence count in a task relation table, for each of the plurality of task relation tables 123_1, 123_2, . . . , and 123_M. A ratio of at least one occurrence count to the total occurrence count in the task relation table may correspond to a probability that a state transition between edges in the Markov chain may be performed.

In operation S930, at least one of the plurality of processing cores 110_1, 110_2, . . . , and 110_N may execute the scheduler 121, and thus, may filter a valid entry having a ratio which may be higher than or equal to a reference ratio and an occurrence count which may be greater than or equal to a reference count in each task relation table.

Referring to FIG. 4, for example, valid entries, having a ratio which may be higher than or equal to the reference ratio and an occurrence count which may be greater than or equal to the reference count, of the first to $i^{th}$ entries E1 to Ei may be filter in the task relation table 410 of the task A (TA). Also, valid entries may be filter in the task relation table 420 of the task B (TB) and the task relation table 430 of the task C (TC).

In operation S940, at least one of the plurality of processing cores 110_1, 110_2, . . . , and 110_N may execute the scheduler 121, and thus, may search for a task set, based on a valid entry and at least one key task. In detail, In operation S930, at least one of the plurality of processing cores 110_1, 110_2, . . . , and 110_N may execute the scheduler 121, and thus, may generate a Markov chain by using a valid entry and at least one key task and may search for at least one key task and tasks, on which a state transition to an edge corresponding to the at least one key task in the Markov chain may be to be performed, as a task set. A detailed method of searching for a task set will be described below with reference to FIGS. 7A and 7B.

Referring to FIG. 9B, in one embodiment, a first Markov chain 910 before filtering a valid entry may be the same as the Markov chain 720 described above with reference to FIG. 7B. Based on a condition for filtering the valid entry described above, in one embodiment, a path for a state transition from the edge K (K) to the edge B (B), a path for a state transition from the edge I (I) to the edge C (C), and a path for a state transition from the edge J (J) to the edge I (I) are excluded. In this case, a second Markov chain 920 illustrated in FIG. 9B may be generated. An edge included in the second Markov chain 920 may be referred to as a valid edge.

As described above, scheduling performance may increase by searching for a task set, based on a Markov chain consisting of a valid edge.

Furthermore, while a user application may be being executed in the electronic device 100, an event such as that a new task is added may occur. In this case, because related tasks may be changed, it may be needed to generate a new Markov chain to search for a task set.

Figure 10A:
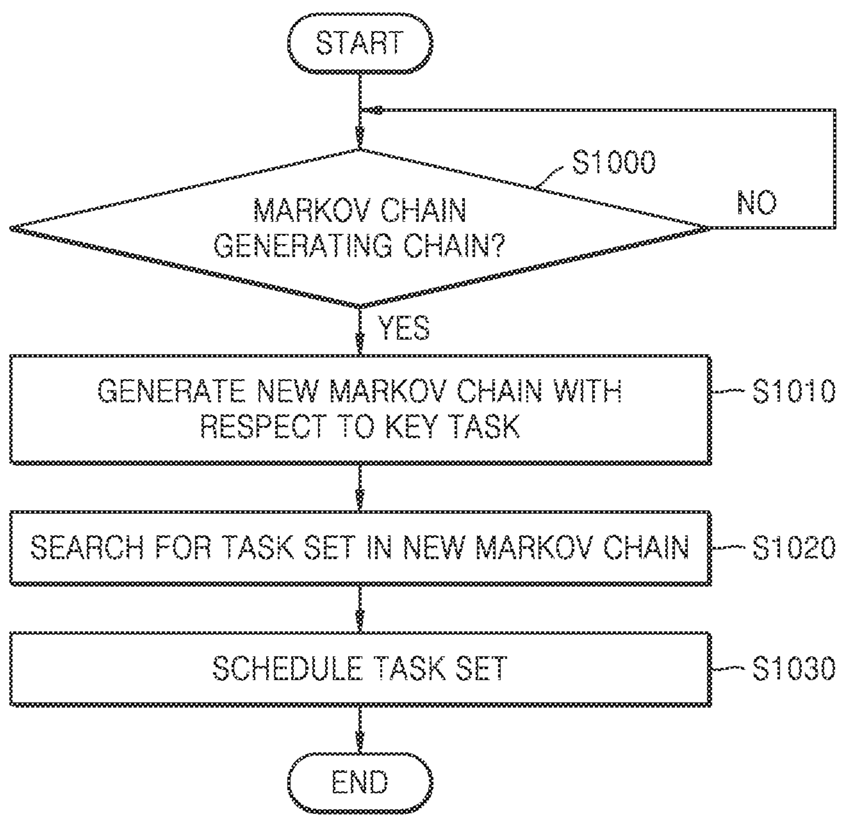
FIGS. 10A to 10C illustrate an operation of generating a Markov chain and searching for a task set, according to another embodiment.
Figure 10B:
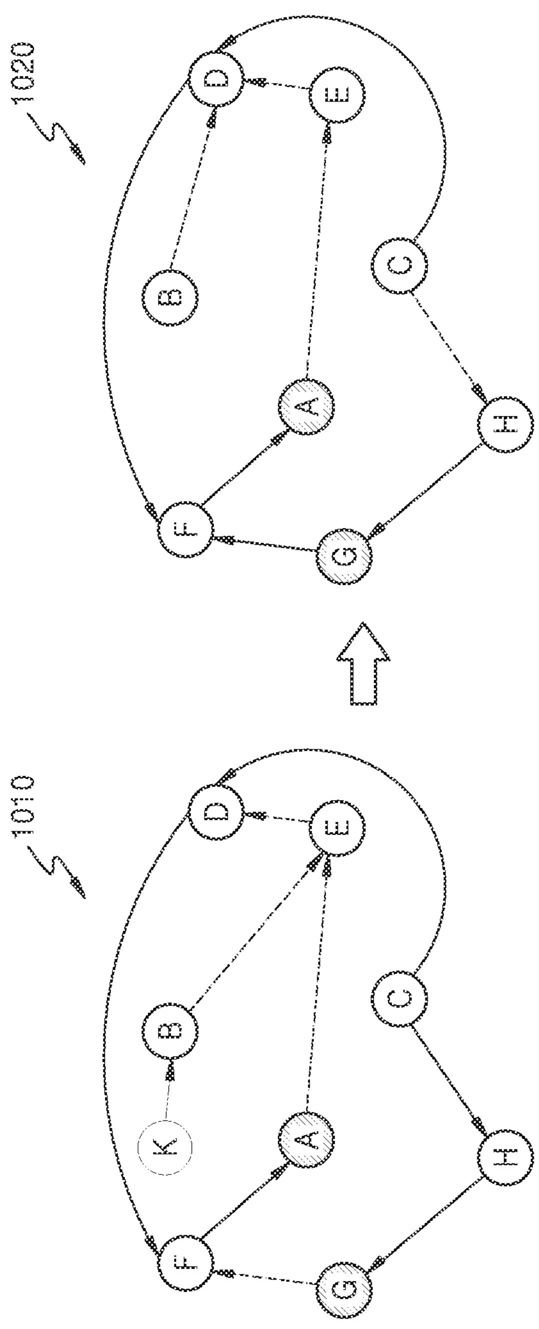
Figure 10C:
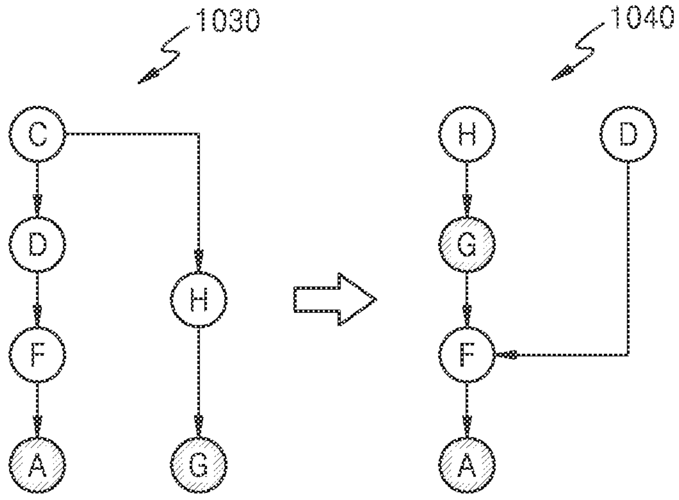

FIGS. 10A to 10C are diagrams for describing an operation of generating a Markov chain and searching for a task set, according to another embodiment.

Referring to FIGS. 1 and 10A, in operation S1000, at least one of the plurality of processing cores 110_1, 110_2, . . . , and 110_N may execute the scheduler 121, and thus, may monitor the occurrence (or not) of a Markov chain generating event. In an embodiment, the Markov chain generating event may periodically occur. For example, a period of an update event may be about 1 s, but is not limited thereto. A period of the Markov chain generating event which periodically occurs may be longer than that of the periodic event described above with reference to FIG. 6A. In another embodiment, the Markov chain generating event may aperiodically occur.

An operation of monitoring the occurrence (or not) of the Markov chain generating event may be performed continuously until the Markov chain generating event occurs in operation S1000 (NO).

When the Markov chain generating event occurs in operation S1000 (YES), in operation S1010, at least one of the plurality of processing cores 110_1, 110_2, . . . , and 110_N may execute the scheduler 121, and thus, may generate a new Markov chain, based on a key task. An embodiment which selects a key task and an embodiment which generates a Markov chain may be similar to the descriptions of FIGS. 7A and 7B.

Referring to FIG. 10B, for example, a new Markov chain 1020 may differ from a shape of a before-chain Markov chain 1010, like a change in a path where a state transition between edges may be performed. In this case, the before-change Markov chain 1010 may be the same as the second Markov chain 920 described above with reference to FIG. 9B.

Referring to FIGS. 1 and 10A, in operation S1020, at least one of the plurality of processing cores 110_1, 110_2, . . . , and 110_N may execute the scheduler 121, and thus, may search for a task set in a new Markov chain. A detailed method of searching for a task set will be described below with reference to FIGS. 7A and 7B.

Referring to FIGS. 10B and 10C, for example, a new path 1040, where a state transition between edges connected to one another by a solid-line arrow except a dotted-line arrow in the new Markov chain 1020 may be performed, may correspond to a task set. In this case, a before-change path 1030 may be the same as the paths 731 and 732 described above with reference to FIG. 7B.

Referring to FIGS. 1 and 10A, in operation S1030, at least one of the plurality of processing cores 110_1, 110_2, . . . , and 110_N may execute the scheduler 121, and thus, may schedule a task set. An embodiment which schedules a task set may be similar to the description of FIG. 8. Referring to FIG. 10C, for example, a task A, a task F, a task G, and a task D respectively corresponding to an edge A (A), an edge F (F), an edge G (G), and an edge D (D) may be assigned in a big core.

As described above, even when an unpredictable event occurs while a user application may be being executed, a new Markov chain may be generated and a task set may be scheduled, and thus, scheduling performance may increase.

FIG. 11 illustrates an electronic device 1100 according to another embodiment.

Referring to FIG. 11, the electronic device 1100 may include a plurality of processing cores 110_1, 110_2, . . . , and 110_N, a memory 120, and a dynamic voltage frequency scaling (DVFS) adjuster 130.

The plurality of processing cores 110_1, 110_2, . . . , and 110_N and the memory 120 may be as described above with reference to FIG. 1.

The DVFS adjuster 130 may adjust a level of DVFS, based on a scheduling state of a task set. For example, when at least some tasks in a task set are assigned in a certain processing core, the DVFS adjuster 130 may increase a frequency of a clock signal, which may be to be applied to the processing core where the task set may be assigned and may increase supply power which may be to be supplied to the processing core where the task set may be assigned.

In this case, the DVFS adjuster 130 may decrease supply power and a frequency of a clock signal of a corresponding processing core, with respect to a processing core where a task set may be not assigned or a processing core where a relatively small number of tasks in a task set are assigned.

The DVFS adjuster 130 may include a DVFS manager 131 and a DVFS controller 132.

The DVFS manager 131 may determine a level of DVFS, based on a scheduling state of a task set, and may supply the DVFS controller 132 with an identifier of a processing core, a first control signal for controlling a frequency level of a clock signal, and a second control signal for controlling a level of the supply power.

The DVFS controller 132 may receive various signals from the DVFS manager 131 and may output an operation signal which changes a frequency level of the clock signal and a level of the supply power. In an embodiment, the DVFS controller 132 may include a clock management unit (CMU) and a power management unit (PMU).

As described above, a level of the clock signal and a level of the supply power may be adjusted based on a scheduling state of a task, and thus, undesired power consumption may be reduced.

Hereinafter, a method of scheduling tasks by using a non-transitory computer-readable storage medium or an electronic device according to embodiments will be described.

Figure 12:
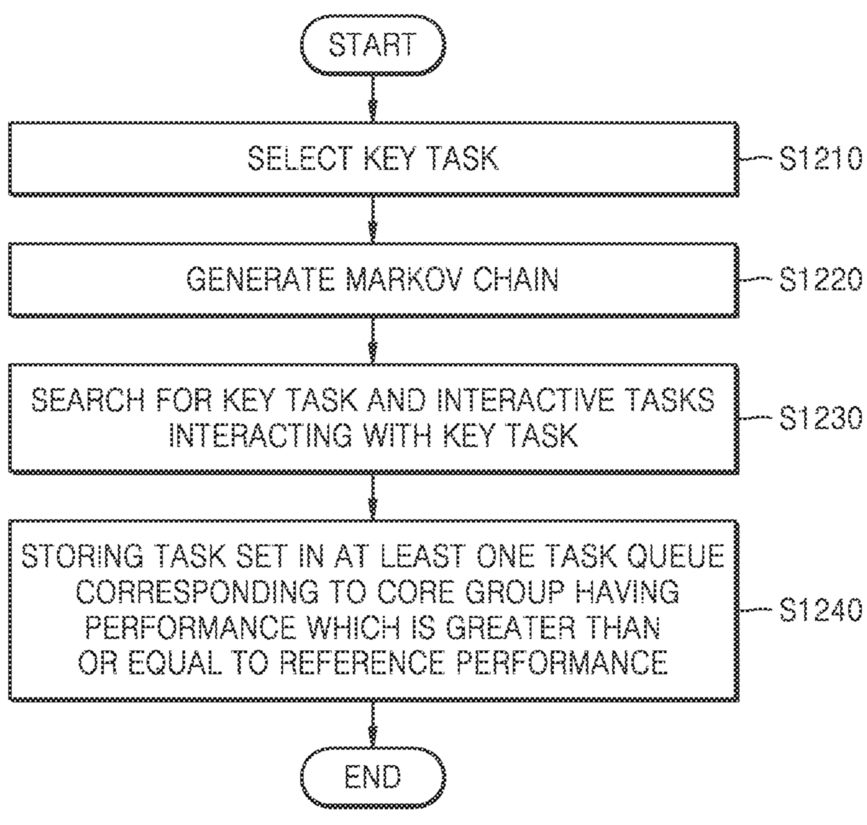
FIG. 12 illustrates a method of scheduling tasks by using an electronic device, according to embodiments.

FIG. 12 is a flowchart for describing a method of scheduling tasks by using an electronic device, according to embodiments.

Referring to FIG. 12, in operation S1210, an operation of selecting at least one key task among a plurality of tasks on the basis of attributes of the plurality of tasks may be performed. In an embodiment, a key task may be selected based on significance of the plurality of tasks. An embodiment which selects a key task may be as described above with reference to FIGS. 7A and 7B.

In operation S1220, an operation of generating a Markov chain representing a probability that a state transition between edges corresponding to tasks is performed, based on a plurality of task relation tables respectively corresponding to the plurality of tasks, may be performed. An embodiment which generates a Markov chain may be as described above with reference to FIGS. 7A and 7B.

In an embodiment, at least one task having a probability which may be higher than or equal to a reference probability may be found in the Markov chain.

In another embodiment, with reference to occurrence counts in a plurality of task relation tables, at least one task having a maximum occurrence count in the Markov chain may be found.

In operation S1230, an operation of searching for at least one key task and interactive tasks interacting with the at least one key task in the Markov chain may be performed. An interactive task interacting with a key task may be a task which wakes up the key task or may be woken up by the key task. In an embodiment, related tasks may include a key task and an interactive task interacting with the key task. An embodiment which searches for a key task and interactive tasks interacting with the key task may be similar to an embodiment which searches for the task set described above with reference to FIGS. 7A and 7B.

In operation S1240, an operation of preferentially storing task sets in at least one of a plurality of task queues respectively corresponding to a plurality of processing cores may be performed. Here, a task set may include at least one task of interactive tasks and may include at least one key task. Operation S1240 may be similar to the embodiment described above with reference to FIG. 8.

A method of scheduling tasks according to embodiments may further include an operation of adjusting a level of DVFS, based on a scheduling state of a task set.

Figure 13:
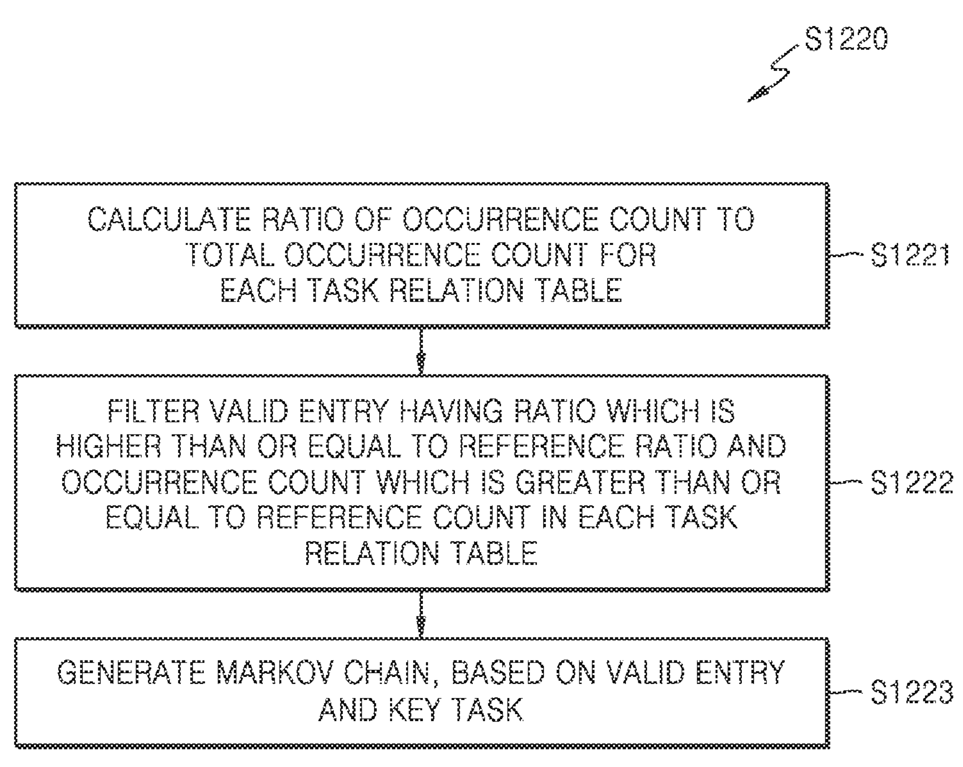
FIG. 13 illustrates a detailed embodiment of an operation of generating a Markov chain illustrated in FIG. 12.

FIG. 13 is a flowchart for describing a detailed embodiment of an operation of generating a Markov chain illustrated in FIG. 12.

Referring to FIG. 13, operation S1220 may include operation S1221, operation S1222, and operation S1223.

In operation S1221, an operation of calculating a ratio of at least one occurrence count to a total occurrence count of each of a plurality of task relation tables may be performed for each task relation table. Operation S1221 may be similar to operation S920 described above with reference to FIG. 9A.

In operation S1222, an operation of filtering a valid entry having a ratio which may be higher than or equal to a reference ratio and an occurrence count which may be greater than or equal to a reference count in each task relation table may be performed. Operation S1222 may be similar to operation S930 described above with reference to FIG. 9A.

In operation S1223, an operation of generating a Markov chain, representing a probability that a state transition between edges respectively corresponding to a wakee task, a waker task, and at least one key task may be performed based on a valid entry and at least one key task, may be performed. Operation S1223 may be similar to operation S940 described above with reference to FIG. 9A.

Figure 14:
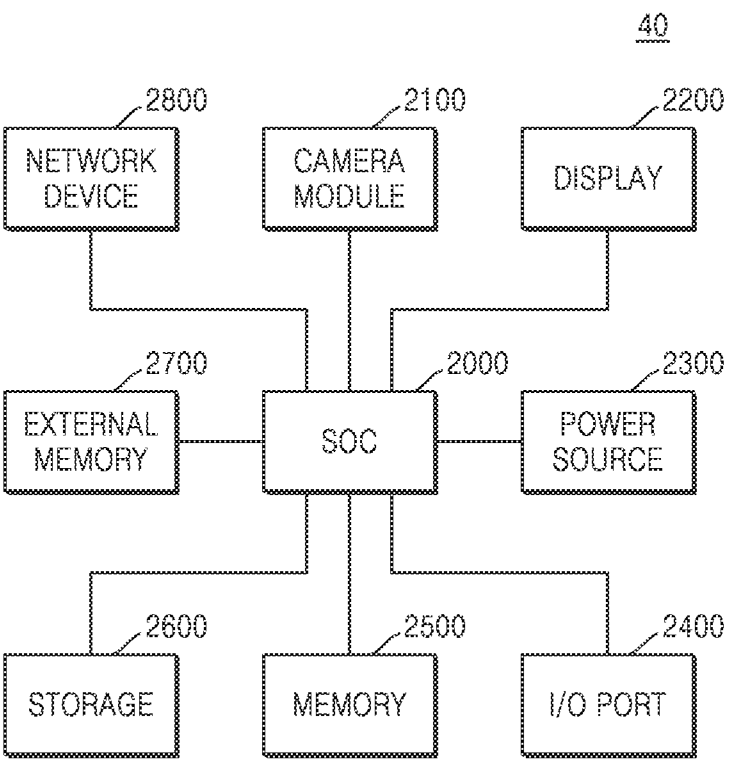
FIG. 14 illustrates an electronic device according to another embodiment.

FIG. 14 is a diagram illustrating an electronic device 40 according to another embodiment.

Referring to FIG. 14, the electronic device 40 may be implemented with a personal computer (PC), a data server, or a portable electronic device.

The electronic device 40 may include a system on chip (SoC) 2000, a camera module 2100, a display 2200, a power source 2300, an input/output (I/O) port 2400, a memory 2500, a storage 2600, an external memory 2700, and a network device 2800.

The SoC 2000 may communicate with the camera module 2100, the display 2200, the power source 2300, the I/O port 2400, the memory 2500, the storage 2600, the external memory 2700, and the network device 2800. The SoC 2000 may process signals which are to be input to the camera module 2100, the display 2200, the power source 2300, the I/O port 2400, the memory 2500, the storage 2600, the external memory 2700, and the network device 2800.

The camera module 2100 may denote a module for converting an optical image into an electrical image. Therefore, the electrical image output from the camera module 2100 may be stored in the storage 2600, the memory 2500, or the external memory 2700. Also, the electrical image output from the camera module 2100 may be displayed by the display 2200.

The display 2200 may display data output from the storage 2600, the memory 2500, the I/O port 2400, the external memory 2700, or the network device 2800.

The power source 2300 may supply an operating voltage to at least one of the elements. The power source 2300 may be controlled by a power management integrated chip (PMIC).

The I/O port 2400 may include ports for transferring data to the electronic device 40 or transferring data, output from the electronic device 40, to an external device. For example, the I/O port 2400 may include a port for accessing a pointing device such as a computer mouse, a port for accessing a printer, or a port for accessing a universal serial bus (USB) drive.

The memory 2500 may be implemented with a volatile memory or a non-volatile memory. According to an embodiment, a memory controller for controlling a data access operation (for example, a read operation or a write operation (or a program operation)) on the memory 2500 may be integrated or embedded into the SoC 2000. According to another embodiment, the memory controller may be implemented between the SoC 2000 and the memory 2500.

The storage 2600 may be implemented with a hard disk drive or a solid state drive (SSD).

The external memory 2700 may be implemented with a secure digital (SD) card or a multimedia card (MMC). According to an embodiment, the external memory 2700 may include a subscriber identification module (SIM) card or a universal SIM (USIM) card.

The network device 2800 may denote a device for connecting the electronic device 40 to a wired network or a wireless network.

Figure 15:
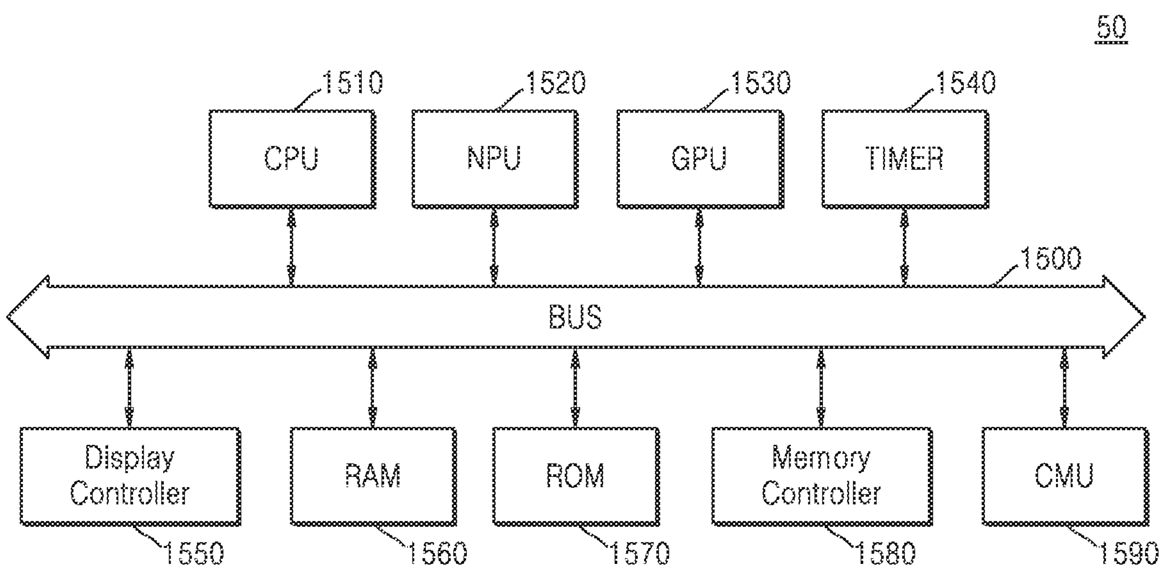
FIG. 15 illustrates a system on chip according to an embodiment.

FIG. 15 is a diagram illustrating a SoC 50 according to an embodiment.

Referring to FIG. 15, the SoC 50 may include a CPU 1510, a neural processing unit (NPU) 1520, a graphics processing unit (GPU) 1530, a timer 1540, a display controller 1550, RAM 1560, ROM 1570, a memory controller 1580, a clock management unit (CMU) 1590, and a bus 1500. The SoC 50 may further include elements other than the illustrated elements.

The CPU 1510 may be referred to as a processor and may process or execute data or programs stored in an external memory. For example, the CPU 150 may process or execute data or programs in response to an operation clock signal output from the CMU 1590.

The CPU 1510 may be implemented with a multi-core processor. The multi-core processor may be one computing component including two or more independent processors (referred to as cores), and each of the processors may read and execute program instructions. Programs and/or data stored in the ROM 1570, the RAM 1560, and/or the memory 1280 may be loaded into a memory of the CPU 1510 depending on the case.

The NPU 1520 may efficiently process a large-scale operation by using an artificial neural network. The NPU 1520 may support a simultaneous matrix operation, and thus, may perform deep learning.

The GPU 1530 may convert read data, read from the external memory by the memory controller 1580, into a signal suitable for the display controller 1550.

The timer 1540 may output a count value representing a time, based on an operation clock signal output from the CMU 1590.

The display controller 1550 may control an operation of an external display device.

The RAM 1560 may temporarily store programs, data, or instructions. For example, programs and/or data stored in a memory may be temporarily stored in the RAM 1560, based on control by the CPU 1510 or a booting code stored in the ROM 1570. The RAM 1560 may be implemented as dynamic RAM (DRAM) or static RAM (SRAM).

The ROM 1570 may store permanent programs and/or data. The ROM 1570 may be implemented as erasable programmable read-only memory (EPROM) or electrically erasable programmable read-only memory (EEPROM).

The memory controller 1580 may communicate with an external memory through an interface. The memory controller 1580 may overall control an operation of an external memory and may control data exchange between a host and the external memory. For example, the memory controller 1580 may write data in the external memory or may read data from the external memory, based on a request of the host. Here, the host may include a master device such as the CPU 1510, the GPU 1530, or the display controller 1550.

The CMU 1590 may generate the operation clock signal. The CMU 1590 may include a clock signal generating device such as a phase locked loop (PLL), a delayed locked loop (DLL), or a crystal oscillator. The operation clock signal may be supplied to the GPU 1530. Also, the operation clock signal may be supplied to the other element (for example, the CPU 1510 or the memory controller 1580). The CMU 1590 may change a frequency of the operation clock signal.

The CPU 1510, the NPU 1520, the GPU 1530, the timer 1540, the display controller 1550, the RAM 1560, the ROM 1570, the memory controller 1580, and the CMU 1590 may communicate with one another through the bus 1500.

The embodiments are not for limiting but are for describing the disclosure, and the scope of the disclosure is not limited by the embodiments. The scope of the disclosure has to be construed by the appended claims, and all spirits within an equivalent range have to be construed as being included in the scope of the disclosure.

Hereinabove, one or more embodiments have been described in the drawings and the specification. Embodiments have been described by using the terms described herein, but this has been merely used for describing the disclosure and has not been used for limiting a meaning or limiting the scope of the disclosure defined in the following claims. Therefore, it may be understood by those of ordinary skill in the art that various modifications and other equivalent embodiments may be implemented from the disclosure. Accordingly, the spirit and scope of the disclosure may be defined based on the spirit and scope of the following claims.

While the disclosure has been particularly shown and described with reference to embodiments thereof, it will be understood that various changes in form and details may be made therein without departing from the spirit and scope of the following claims.

What is claimed is:

1. An electronic device comprising:

a plurality of processing cores; and a memory comprising a plurality of task queues respectively corresponding to the plurality of processing cores, a plurality of task relation tables corresponding to a plurality of tasks, and a scheduler, wherein:

each of the plurality of task relation tables comprises a first number of entries representing a mapping relationship between an identifier of a waker task that wakes up a wakee task, and an occurrence count that is a number of times the wakee task is woken up by the waker task, a first processing core among the plurality of processing cores is configured to execute the scheduler to store a subset of tasks of a task set comprising related tasks in a first task queue among the plurality of task queues, the task set is based on the plurality of task relation tables, the first processing core is configured to sequentially execute the subset of tasks of the task set stored in the first task queue, and at least one processing core among the plurality of processing cores is configured to execute the scheduler to store at least one updated task relation table of a plurality of updated task relation tables in the memory when the first processing core executes a first waker task waking up a first wakee task, wherein:

each of the plurality of updated task relation tables includes a second number of entries less than the first number of entries, each of the second number of entries corresponds to an occurrence count that is not less than a reference count, the occurrence count of each entry included in the plurality of updated task relation tables is less than an initial occurrence count in response to an update event, and the occurrence count in a first updated task relation table among the plurality of updated task relation tables corresponding to the first wakee task is greater than the occurrence count in the other updated task relation tables.

2. The electronic device of claim 1, wherein:

at least one key task among the plurality of tasks is based on attributes of the plurality of tasks, a Markov chain representing a probability of a state transition between an edge corresponding to the waker task and an edge corresponding to the wakee task is based on the plurality of task relation tables, and the task set includes the at least one key task and tasks in which a state transition to an edge corresponding to the at least one key task is to be performed in the Markov chain.

3. The electronic device of claim 2, wherein at least one of the tasks in the task set has a probability that is higher than or equal to a reference probability of the tasks in which the state transition to the edge corresponding to the at least one key task is to be performed.

4. The electronic device of claim 2, wherein at least one of the tasks in the task set has a maximum occurrence count among the tasks in which the state transition to the edge corresponding to the at least one key task is to be performed, with reference to occurrence counts in the plurality of task relation tables.

5. The electronic device of claim 2, wherein the subset of tasks comprise a key task corresponding to a final edge in which a state transition is lastly performed and a task corresponding to an edge in which a state transition to the final edge is performed, and wherein a first task is scheduled prior to the key task.

6. The electronic device of claim 1, wherein:

at least one key task among the plurality of tasks is based on attributes of the plurality of tasks, a valid entry of at least one of the first number of entries and the second number of entries has a ratio that is higher than or equal to a reference ratio and an occurrence count that is greater than or equal to a reference count in each task relation table, the reference ratio is a ratio of at least one occurrence count to a total occurrence count in each of the plurality of task relation tables, and the task set is based on the valid entry and the at least one key task.

7. The electronic device of claim 6, wherein:

the task set is based on the at least one key task and tasks in which a state transition to the edge corresponding to the at least one key task is to be performed in a Markov chain, and the Markov chain is based on the valid entry and the at least one key task.

8. The electronic device of claim 1, wherein an initialized occurrence count of each entry is included in the plurality of task relation tables.

9. The electronic device of claim 1, wherein a divided occurrence count of each entry is included in the plurality of task relation tables based on a division value.

10. The electronic device of claim 1, wherein an adjusted occurrence count of each entry is included in the plurality of task relation tables based on an integer that is less than the occurrence count.

11. The electronic device of claim 1, further comprising a dynamic voltage frequency scaling (DVFS) adjuster configured to adjust a level of a DVFS including adjusting supply power and a frequency of a clock signal of a corresponding processing core based on a scheduling state of the task set.

12. A method comprising:

storing a subset of tasks in at least one task queue of a plurality of task queues respectively corresponding to a plurality of processing cores; and storing at least one updated task relation table of a plurality of updated task relation tables in a memory when a first processing core of the plurality of processing cores executes a first waker task waking up a first wakee task, wherein:

the stored subset of tasks comprises at least one key task of a plurality of tasks and at least one interactive task of a plurality of interactive tasks, the at least one key task is based on attributes of the plurality of tasks, the plurality of interactive tasks interacts with the at least one key task in a Markov chain representing a probability that a state transition between edges corresponding to the plurality of tasks is performed based on a plurality of task relation tables respectively corresponding to the plurality of tasks, each of the plurality of task relation tables comprises a first number of entries representing a mapping relationship between an identifier of a waker task that wakes up a wakee task, and an occurrence count that is a number of times the wakee task is woken up by the waker task, each of the plurality of updated task relation tables includes a second number of entries less than the first number of entries, each of the second number of entries corresponds to an occurrence count that is not less than a reference count, the occurrence count of each entry included in the plurality of updated task relation tables is less than an initial occurrence count in response to an update event, and the occurrence count in a first updated task relation table among the plurality of updated task relation tables corresponding to the first wakee task is greater than the occurrence count in the other updated task relation tables.

13. The method of claim 12, wherein the Markov chain is further based on:

a ratio of at least one occurrence count to a total occurrence count in each of the plurality of task relation tables;

a valid entry in each task relation table, wherein the valid entry has a ratio that is higher than or equal to a reference ratio and an occurrence count that is greater than or equal to a reference count; and the at least one key task, wherein the Markov chain further represents a probability that a state transition between edges respectively corresponding to a wakee task, a waker task, and the at least one key task is performed.

14. The method of claim 12, wherein the at least one key task in the Markov chain has a probability that is higher than or equal to a reference probability.

15. The method of claim 12, wherein the at least one key task having has a maximum occurrence count in the Markov chain with reference to occurrence counts in the plurality of task relation tables based on the plurality of interactive tasks interacting with the at least one key task in the Markov chain.

16. The method of claim 12, further comprising adjusting a level of dynamic voltage frequency scaling (DVFS) including adjusting supply power and a frequency of a clock signal of a corresponding processing core based on a scheduling state of the subset of tasks.

17. A non-transitory computer-readable storage medium storing instructions executed by at least one of a plurality of processing cores classified into at least two core groups based on performance, the instructions comprising:

storing a subset of tasks in at least one task queue of a plurality of task queues respectively corresponding to a core group of the at least two core groups; and storing at least one updated task relation table of a plurality of updated task relation tables in a memory when a first processing core of the plurality of processing cores executes a first waker task waking up a first wakee task, wherein:

the stored subset of tasks comprises at least one key task of a plurality of tasks and at least one interactive task of a plurality of interactive tasks, the at least one task queue has performance that is higher than or equal to a reference performance, the at least one key task is based on attributes of the plurality of tasks, the plurality of interactive tasks interacts with the at least one key task in a Markov chain representing a probability that a state transition between edges corresponding to the plurality of tasks is performed based on a plurality of task relation tables respectively corresponding to the plurality of tasks, each of the plurality of task relation tables comprises a first number of entries representing a mapping relationship between an identifier of a waker task that wakes up a wakee task, and an occurrence count that is a number of times the wakee task is woken up by the waker task each of the plurality of updated task relation tables includes a second number of entries less than the first number of entries, each of the second number of entries corresponds to an occurrence count that is not less than a reference count, the occurrence count of each entry included in the plurality of updated task relation tables is less than an initial occurrence count in response to an update event, and the occurrence count in a first updated task relation table among the plurality of updated task relation tables corresponding to the first wakee task is greater than the occurrence count in the other updated task relation tables.

18. The non-transitory computer-readable storage medium of claim 17, wherein the Markov chain is further based on:

a ratio of at least one occurrence count to a total occurrence count in each of the plurality of task relation tables;

a valid entry in each task relation table, wherein the valid entry has a ratio that is higher than or equal to a reference ratio and an occurrence count that is greater than or equal to a reference count; and the at least one key task, wherein the Markov chain further represents a probability that a state transition between edges respectively corresponding to a wakee task, a waker task, and the at least one key task is performed.

19. The non-transitory computer-readable storage medium of claim 17, wherein the at least one key task in the Markov chain has a probability which is higher than or equal to a reference probability in the Markov chain based on the plurality of interactive tasks interacting with the at least one key task in the Markov chain.

20. The non-transitory computer-readable storage medium of claim 17, wherein the at least one key task is based on a significance of each of the plurality of tasks.

* * * * *